(12) United States Patent
Myer

(10) Patent No.: US 10,573,176 B2
(45) Date of Patent: *Feb. 25, 2020

(54) SOLAR MODULAR POWER WITH PARALLEL AC AND DC WIRING

(71) Applicant: Seth Myer, Eagle Mountain, UT (US)

(72) Inventor: Seth Myer, Eagle Mountain, UT (US)

( * ) Notice: Subject to any disclaimer, the term of this patent is extended or adjusted under 35 U.S.C. 154(b) by 82 days.

This patent is subject to a terminal disclaimer.

(21) Appl. No.: 15/984,564

(22) Filed: May 21, 2018

(65) Prior Publication Data
US 2018/0268693 A1 Sep. 20, 2018

Related U.S. Application Data

(63) Continuation of application No. 14/951,184, filed on Nov. 24, 2015, now Pat. No. 9,978,275.

(51) Int. Cl.
| | |
|---|---|
| *H02J 3/00* | (2006.01) |
| *G08G 1/0967* | (2006.01) |
| *H02S 30/10* | (2014.01) |
| *H02S 40/32* | (2014.01) |
| *H02S 40/38* | (2014.01) |
| *H02J 3/38* | (2006.01) |
| *H02J 7/35* | (2006.01) |

(52) U.S. Cl.
CPC ........ *G08G 1/096783* (2013.01); *H02J 3/385* (2013.01); *H02J 7/35* (2013.01); *H02S 30/10* (2014.12); *H02S 40/32* (2014.12); *H02S 40/38* (2014.12)

(58) Field of Classification Search
CPC .................................................. H02J 3/385
USPC ............................................... 307/82
See application file for complete search history.

(56) References Cited

U.S. PATENT DOCUMENTS

| | | | | |
|---|---|---|---|---|
| 2013/0285452 A1* | 10/2013 | Gramm | ........... | H02J 7/355 307/48 |
| 2015/0171632 A1* | 6/2015 | Fry | ........... | H02J 7/0004 307/22 |
| 2016/0329719 A1* | 11/2016 | Meyer | ........... | H02J 3/383 |

* cited by examiner

*Primary Examiner* — Hal Kaplan
*Assistant Examiner* — Dru Parries
(74) *Attorney, Agent, or Firm* — Malone IP; Steven J. Malone

(57) ABSTRACT

Modular solar systems comprise one or more module units that are connectable into a system/assembly for convenient installation on a roof or other surface that receives solar insolation. The modules are adapted for electrical, and preferably also mechanical, connection into a module assembly, with the number of modules and types of modules selected to handle the required loads. Each module is adapted and designed to handle the entire power of the assembly and to provide or receive control signals for cooperative performance between all the modules and for monitoring and communication regarding the assembly performance and condition.

20 Claims, 14 Drawing Sheets

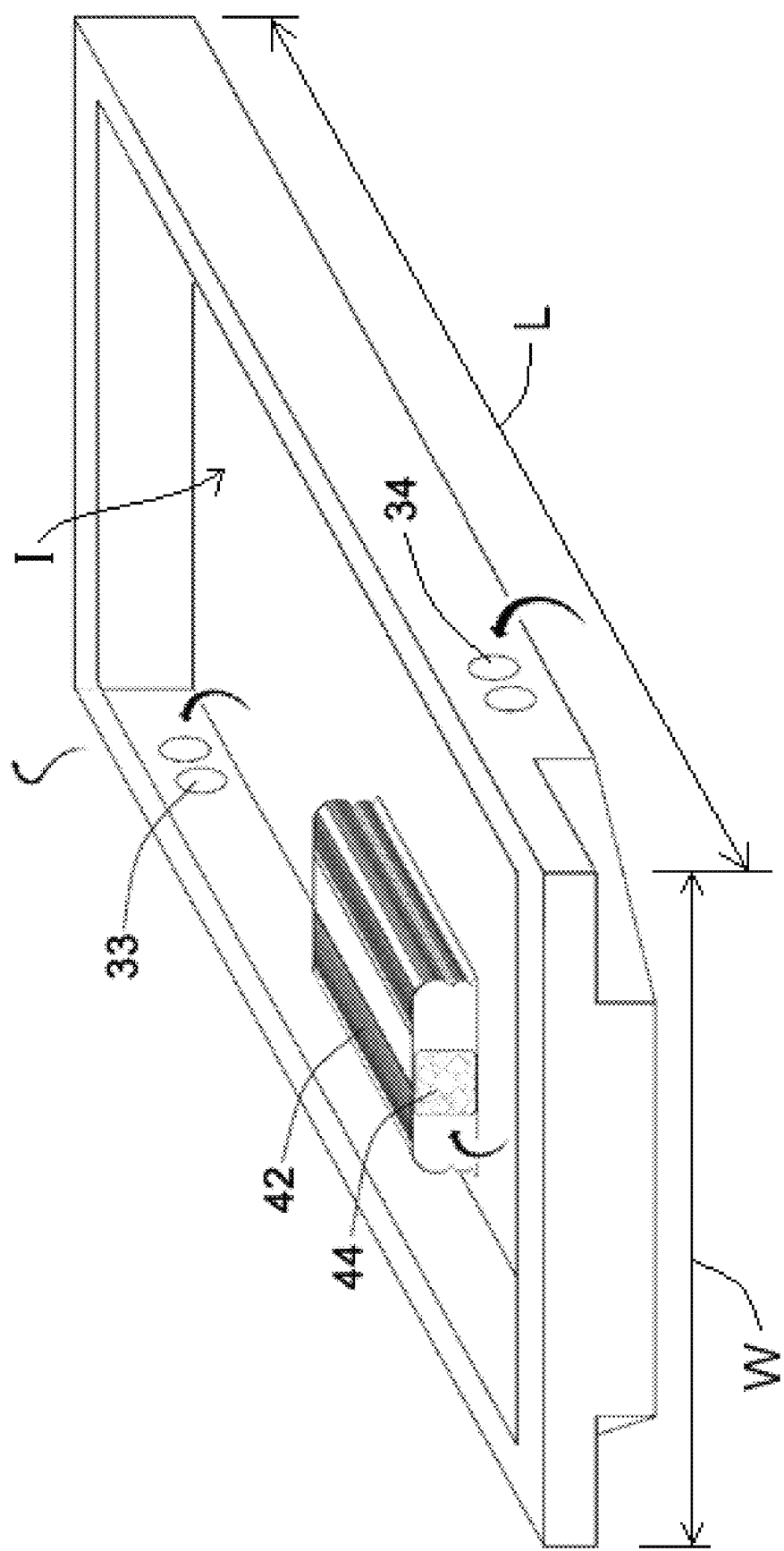

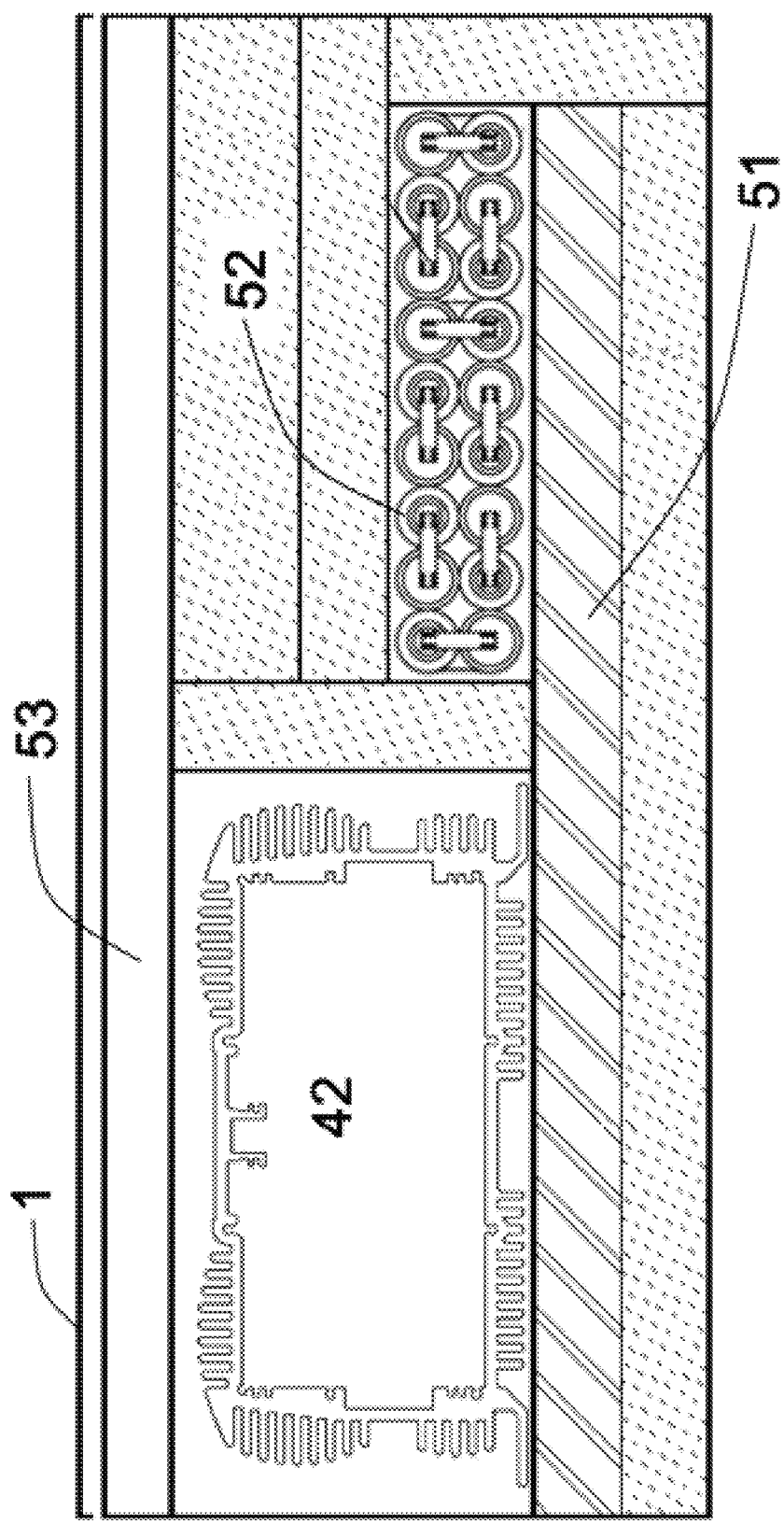

Solar Modular Power with Parallel AC and DC Wiring

SOLAR MODULAR POWER WITH PARALLEL AC AND DC WIRING

This application is a continuation application of U.S. patent application Ser. No. 14/951,184, filed Nov. 24, 2015, the entire disclosures of which are hereby incorporated herein by reference.

BACKGROUND OF THE INVENTION

1. Field of the Invention

The invention relates to modular solar systems that comprise one or more module units that are connectable into a system/assembly for convenient installation on a roof or other surface that receives solar insolation. The modules are adapted for electrical, and preferably also mechanical, connection into a module assembly, with the number of modules and types of modules selected to handle the required loads. Each module is adapted and designed to handle the entire power of the assembly and to provide or receive control signals for cooperative performance between all the modules and for monitoring and communication regarding the assembly performance and condition.

2. Related Art

For AC power systems (and all power systems where there is a load and a supply), the generation (supply power) and demand (load) must be equal. In other words, the Utility Supply must equal the Customer Load. If there is ever a power outage, the re-connection of the circuits after the fault is cleared must be done carefully to assure that the loads are connected in a phased or staged fashion. This assures that the required balance is maintained while restoring power.

AC distribution systems are designed in such a way to allow this. There are distribution systems (with protection in the form of fuses and circuit breakers) with switches to allow each part of the system to be isolated and controlled.

On both sides (supply and demand) of a conventional Utility Grid, therefore, the system is designed in sections or blocks of power to allow for this distribution and equalization. These divisions are isolated by circuit breakers, load centers, distribution panels, transformers and utility substations. This is because the power needs to be carefully distributed from available generation systems that are in turn delivered to quantified loads that are supplied over wiring and distribution circuiting sized to handle the specific power for each circuit.

Solar-powered autonomous devices have been designed for emergency use (for example, during power outage in a hurricane or other catastrophe), or for other non-grid tied applications, wherein "autonomous" herein means the device is designed for, and relies solely on, solar-panel-charging of batteries or other energy-storage device, without a grid tie. Such conventional autonomous devices do not include the balance of supply and demand that is included in certain embodiments of the invention, and are not modularly-expandable, by connecting multiple modules, as are certain embodiments of the invention. Such conventional autonomous devices are built in a specific system, or "emergency box", size, and cannot be expanded beyond that single size and power-producing capability. So, such conventional autonomous devices cannot be expanded to serve a larger load than the single "box" size is designed for. The only choice for serving larger loads with such conventional autonomous systems is to buy a bigger system, that is, a bigger, single "emergency box" with higher load-serving capacity.

SUMMARY OF THE INVENTION

The invention comprises a solar-powered module, and assemblies of solar-power modules, wherein the modularity allows easy transport and installation on a building roof or other surface where solar insolation occurs. The modules are each adapted for electrical, and preferably also mechanical, connection into a module assembly, wherein additional modules are added, either in the form of subordinate modules, primary modules or main modules, to handle the required loads and to provide control of each of the modules, for example, to control how the solar panels charge the energy-storage devices of each and all the modules via a DC system, to control AC waveform of the inverter of each module, and to load-shed according to predetermined outlet/load priorities. Each module is adapted and designed to handle the entire power rating/load of the assembly and to provide or receive control signals for cooperative performance between all the modules and for monitoring and communication regarding the assembly performance and condition.

Each module in the preferred system is designed with a higher power rating than what would normally be required for a single module, so that future applications/uses may be served even when the total served load changes. Each individual module is therefore "ready" to accept these higher loads, if and when the individual modules is once placed in a larger system, that is, placed in an assembly of connected modules. Thus, while, in certain embodiments, some or all the modules are operable and effective in single-module applications, the preferred modules are "pre-sized" or "pre-adapted" to handle combined loads of several modules connected together. In other words, each preferred module is sized to accommodate the loads of multiple modules and will act as a sub-panel within the assembly of modules, but the preferred modules are electrically, and preferably mechanically, connectable and operable, without requiring any conventional AC system service panel or sub-panel to be added to the assembly of modules, and without requiring the services of an electrician.

Many objects of certain embodiments of the invention will become apparent from the following description, to solve needs for conveniently-packaged and shipped modules of uniform dimensions, convenient and clear electrical and mechanical connectability, convenient and clear status and performance monitoring and reporting, and/or effective grid-tie options with AC waveform control.

BRIEF DESCRIPTION OF THE DRAWINGS

FIG. 4a is a perspective view of an open module, according to the embodiment of FIG. 1, showing the airflow thru the enclosure.

FIG. 5b is a cross section of the module, along the line 5b-5b in FIG. 5a, showing the batteries, inverter and insulation.

DETAILED DESCRIPTION OF CERTAIN EMBODIMENTS

Figure 1:
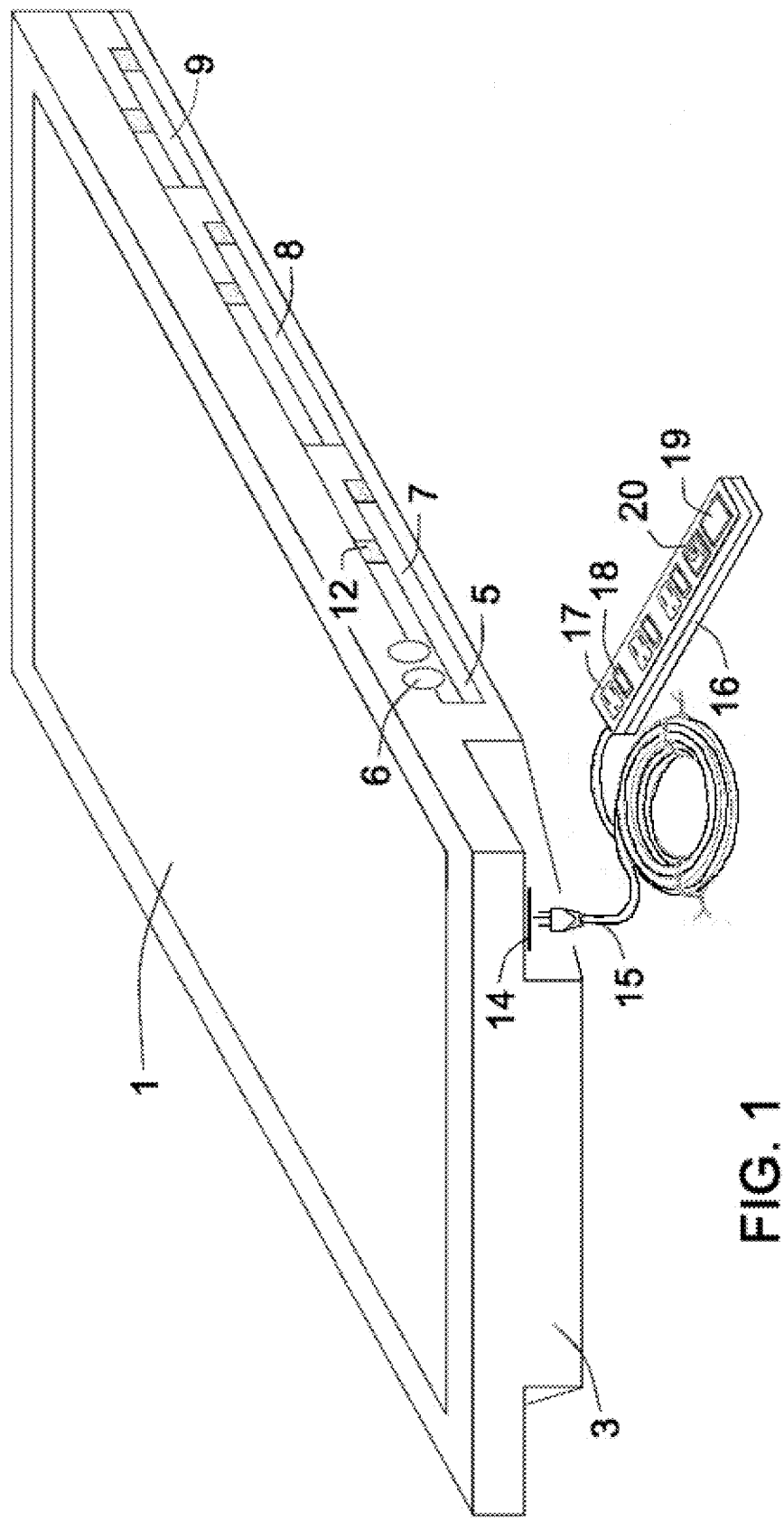
FIG. 1 is a perspective view of one embodiment of a single module.

Main System Components:

Certain embodiments of the invented Solar Modular Power System (SMPS) are for meeting the needs of an individual home, apartment building, individual business building, or other individual building, to supplement, or supply entirely, said home's or building's energy needs. While the SMPS is of a scale and structure that is efficiently shipped, installed, and operated on a single home or building, the SMPS is specially adapted to have features similar to those of a much larger power system, that is, of a AC Utility Power Grid/System. More specifically, said features comprise that the system is divided into individual modules that can be controlled and balanced with each other, the solar supply power, and the loads they are serving.

The SMPS comprises, consists essentially of, or consists of, at least one module, and preferably multiple of said modules, that can each operate and function independently. The module is a complete solar powered power supply with energy storage that is completely self-contained. The output of the module is AC power (via an electrical AC receptacle). Even in an individual module, the supply and demand must be managed and controlled.

The preferred system comprises, consists essentially of, or consists of, multiple modules connected together to increase the overall power of the system in order to serve larger loads. A single module may be only capable of serving a 10-amp, 120 VAC load. However, multiple modules when connected together would be capable of serving much larger loads (up to 60 amps at 240 volts).

The Inventor has determined that multiple solar power supplies cannot be just "simply connected" together, and so connection of multiple of the SMPS modules is specially designed and structured to include features that are not included in conventional "solar in a box", "plug and play solar panels", or "emergency solar box generators". The inventor has determined that each sub-system (module) of the SMPS must be integrated through a distribution system that: 1) Assures that each power generating system is balanced with the energy storage system(s), and the electrical loads within the module; 2) Has circuit protection to protect against and isolate faults; and 3) Actively manages the power between the modules (system balancing).

The approach taken to assure that this is done properly is to design each module with the interfacing bus bar or wiring, for electrically connecting the multiple modules, being sized to accommodate the full load of the combined system (once multiple modules are connected together). The circuit protection, monitoring and control are also designed to allow the balancing of the system, along with isolating faults in the system to allow the system to continue to operate when there is a failure in one of the system components. For example, if one battery bank is failing, the system isolates this bank from the rest of the system in order to allow the remaining battery banks to operate without having the bad bank bringing down the entire system (potentially lowering the voltage to a point that the loads can no longer be served).

The main module, or "primary" module, contains all of the system power, monitoring and control features for a complete and operational system. Additional subordinate modules can be connected to the primary module in order to increase the overall power of the system. Each system has a specific maximum power rating that corresponds to the total connected power rating of the combined system. In other words, if the largest load to be expected from the system after all modules are connected together will be 2 kW, then the primary and subordinate modules must have this same rating. This assures that, once all of the modules are connected together, the combined load over the bus bar and/or interconnection wiring is large enough to handle this maximum load. The monitoring and control system prevents the interconnection of modules with incompatible ratings.

Each module has a module rating and a system rating. The module rating is what that single individual module is capable of producing (solar power) and storing. The module has an energy rating (stating the total storage capacity), and a system rating that describes the maximum system size it can be integrated into. For a single module, the energy rating may be 1 kWh (storage capacity) with a power rating of 500 watts, and a system rating of 2 kW. So, a total system consisting of four (4) 500 W modules with a system power rating of 2 kW would have a total energy capacity of 4 kWh (4 modules at 1 kWh each).

The two main forms of electrical power being monitored and controlled in the system are AC power and DC power. Each individual module has both of these systems (AC and DC), which are isolated and separated from each other within the module enclosure. See FIGS.

The modules are electrically connected by means of interconnection bus bars (which preferably also mechanically connect the modules) and/or wiring, which allow the sharing of power between the modules. While bus bars are preferred in certain embodiments, wiring by means of electrically-conductive wire or cable may be the interconnection means, or may supplement a bus bar interconnection means. Both DC and AC electrical connection is shared over the bus bar or wiring interconnection. In addition to AC and DC interconnection, the monitoring or network interconnected is also done by means of said interconnection bus bars or wiring. See FIG. 1, notes 7, 8, 9. Each of these systems (AC, DC, and data) are kept separated and isolated from each other over the bus bar and/or wiring interconnection.

The primary module (PM) can be viewed as an electrical load center or main service panel that serves the load(s). All of the system subordinate modules (SM) feed into the PM in order to supply the combined power required for the system. Thus, the load(s) served via the PM are supported by the power capacity of the total system. For example, 4 modules at 500 watts each connected together would be able to serve 2 kW of load.

The PM has circuit protection (fuses and/or circuit breakers) as well as controls to allow the isolation and control of each of the interconnected SMs. Both supply and load power, within each module and also within the system (that is, the combined system of PM and SMs), are able to be controlled, balanced and modified (if required—load shedding or isolating faults) by the control system (or "controller") of the PM.

For embodiments that require more power than a single PM with multiple SMs can provide, then 2 or more PMs can be connected to serve these larger loads. If multiple, connected PMs are not enough, certain embodiments are designed to allow the integration of 2 SMPS systems. This is accomplished by adding a "Main" module that is rated higher than the PMs. So, for example, if the system is maxed out with (4) 2 kW PMs (for a total of 8 kW) and more power is needed, a Main module (M) that is rated for 20 kW could be added to the system. For example, each of 4 PMs would be connected to the M, and additional PMs (with attached SMs) could then be added to the entire assembly in order to achieve the higher capacity. The M would be the only component that would need to have the highest rating, since each system would be feeding into M, and would only be exposed to the lower rating. Module M, along with its output receptacle, would be rated for the highest capacity as required.

The inventor has determined that there are 3 requirements in order to combine multiple modules according to preferred embodiments of the invention:

1. Because the total SMPS (or "total system") power delivered (and the power produced from the solar) is higher for multiple modules, each individual module must be capable of supporting the total system power. So, if a single module, only capable of producing 500 watts by itself, is placed into a system that is capable of producing 2 kW, the individual module must be able to handle the higher load of 2 kW. Any shared components must be rated for the total or shared power ratings once they are connected together. So, for example, if the system is sharing AC power, then each inverter must be rated for the parallel operation with the other inverters in the system at the total delivered power rate. The electrical conductors (bus bar and/or wire) must be sized to accommodate the total system load (not just the load of one module).

2. In order to benefit from the total system power of the combined modules, each module must be connected to the other modules in the system. This connection allows for the sharing of stored energy (higher storage capacity compared to a single module). It also increases the available instantaneous power—the number of amps that can be delivered in real time. This provides a higher inrush current for loads that require higher amperage than a single module can deliver.

3. The DC power must be kept separate from the AC power. Since every module has both AC and DC "on board", the sharing of power between the modules must also be kept separate (AC and DC must be isolated and delivered to adjacent modules in separate wires or bussing).

Structural changes in the modules that are required in certain embodiments so that each module is adapted and designed to handle the entire power rating/load of the assembly, may include one or more, and typically all, of the following:

1. In order to interconnect multiple modules, the bus bar or wiring that connects multiple modules must be sized large enough to handle the combined loads served by the total system (with multiple modules connected together). This bus bar is preferred for the desired modularity, but, in certain embodiments wherein only one module will be used, it is not required.

2. With multiple modules connected together, paralleling inverters are required so that the modules can share the combined power output (and thus increasing the total combined power output of the system). Or, alternatively but less preferably, one of the inverters in the system must be sized large enough to handle the total combined system load.

3. With multiple modules connected together, there must be circuit protection (circuit breakers) for safety and to isolate faults within each module, and to separate these faults from the interconnected modules. The circuit breakers serve the purpose of power distribution to other modules, providing the capability of isolating one module from the other modules in the system (if there is a fault within that module) while still maintaining the full operation of the system—removing the one problem module from the loop.

4. The parallel wiring (bus bar) along with the control system provide a way to manage the combining of the power from multiple modules. The control system allows the power to be distributed and controlled to serve the multiple loads as required. For example, if there are 240 volt loads along with 120 volt loads, the distribution system controls the output required to serve these different loads. The combined power of several modules can be leveraged to serve the larger loads, while still being able to maintain the smaller loads via a separate lower voltage outlet. The control system is an important feature of the connections between the modules and turns on and off circuits as required.

From a safety and control standpoint, there are also requirements. Each circuit must be protected from an electrical fault. This is done with fuses and/or circuit breakers. For control, each subsystem/component must have a method of being connected to or disconnected from the system. This is done with relays, switches and/or electronic control systems (with transistors and the like). This applies locally (to one module) and to the whole system (whole assembly). Once the modules are physically connected (and electrically connected) this isolation and control extends across the whole system/assembly.

Control System:

The control system is comprised of a main controller located in the primary "P" or main "M" module. Each module that is connected to the main controller also has a controller that connects that module to the main controller, and controls everything within that individual module. The part of the control system that is down at ground level is the user interface to the control system. It allows the user to monitor and control the system from there, without having to climb up on the roof R (schematically shown in FIG. 2). A similar interface is provided via the wireless connection to the internet. For systems with this wireless interface, the user can monitor and control the entire system (and individual modules connected via the wireless) on their computer via the web interface.

With a small system (only P modules), the P module's controller is the main controller of the system. Once the P module(s) are connected to an M module, the M module becomes the main controller. All controllers are networked to the main controller, and any global monitoring or control actions are carried out through this main controller.

The control system (CS, or also "controller") monitors and controls the connection of additional modules. In order to connect multiple modules, the first or "primary" module ("P" or "PM") is the first one in the system. The primary module can operate by itself with no other modules connected to it. In order to increase the total system power, additional "subordinate" or "secondary" modules ("S" or "SM") can be connected to the P module. As each S module is connected to the system (placed in line with a number of S modules with P at the head of the system), the control system will confirm that the S modules are compatible and will make the electrical connections required in order to incorporate the additional S module into that system. Additional S modules can be placed into the system until the total rated system power has been reached (or, a "full" system). If an additional module is attempted to be placed into a full system, the CS will alert the user with audible and/or visual notifications that the max has been reached. If the user ignores the warnings, the CS will not allow the module to be electrically connected (even if it is mechanically connected). For every system there is a limit to the number of modules that can be connected to that system. In the example shown in FIG. 6b, the maximum number of S modules that can be connected to the P module are shown. If you attempt to connect an additional S module to this system (a ninth S module—beyond the 8 S modules shown), the system will be overloaded. At this point, the only way to expand the system beyond 8 S modules is to add an additional P module. The factory preset does not allow the system to operate connected in this manner (with too many modules for the rating). There are user-selected defaults that will allow the mechanical connection, however, the electrical will not be connected (and the warning light will remain). The digital readout will indicate what the problems is (ie: too many modules connected to system).

The CS monitors and controls all of the system functions, as are described herein and/or as will be understood by one of skill in the art after reading and viewing this document and the drawings. The CS is connected by wiring (data wiring, Ethernet or similar) to the control unit. While the solar modules are typically placed up on the roof or in an otherwise elevated position, the control system user interface is typically down at ground level so that it is accessible to the user. The CS can also be connected via wireless (WIFI, Bluetooth, or similar) to the internet.

In certain embodiments, if there are problems with the system that cannot be resolved by the user locally, the CS, can be accessed by personnel at a remote help desk. In certain embodiments, all of the system functions (both monitoring and control) can be done remotely provided that there is an internet connection. The local connection to the internet can also be powered by the SMPS to assure that this feature is always available (even when there is a utility power outage).

Every system issue that arises (faults, under-voltage, over-voltage, over-current, battery failure, etc.) may be reported to the CS and a notification is sent based on the nature of the issue. For serious issues (fault or complete system failure) there are default settings that immediately and automatically take required actions by the CS. For example, for a catastrophic event (for example, tree falls on module and completely crushes it), the CS will shut down all systems immediately to prevent further electrical damage to the system. All circuits would be "opened" by switches and other means to disconnect and shut down the electrical system. Other less serious issues may be sent to the CS (for example, a "trouble", "notification", or "alarm" notification, etc) and the audible and/or visual alarms would sound based on the nature and severity of the problem.

Energy Management System:

In order to maintain the total storage capacity of the system, the CS continuously monitors the health of the batteries. The Energy Management System (EMS) monitors the power production (from solar) and controls how much power is delivered to the loads. There are many factors that affect the storage capacity of the system. How much solar energy is available on any given day is one of the main factors. If there are multiple cloudy days, the CS will conserve the amount of power that is delivered to the loads in order to maintain the most important operational features/apparatus if there is minimized energy production.

Temperature can also influence battery health. The EMS is equipped with temperature sensors that report the temperature of the electronics and the batteries. Cooling systems for overheating are preferably included and can be turned on when temperatures exceed a maximum level (pre-set at the factory based on the battery type). When temperatures drop below a minimum, actions are taken to keep the battery healthy in these conditions. Some of these actions preferably include turning off a "fresh air" electronics cooling fan, and turning on a internal "re-circulating" fan that distributes the electronics compartment air into the battery compartment.

In addition to insulation around the batteries, phase change material may also be utilized to even out the temperature swings from day to night. This prevents both temperature extremes (too hot or too cold). In addition to these components, the batteries may be placed on a conductive plate (copper or aluminum or other conducting material) that is shared with the electronic components compartment. During the summer or hot days, the amount of heat transferred from the electronics compartment to the battery compartment will be minimal. This is due in part to the fact that the fresh air fan will be keeping the electronics compartment cool when it is hot outside. When the air is cold outside, the heat from the electronics compartment will be conducted through the base plate to the batteries to help them stay warm.

Batteries do produce a small amount of heat when they are charging and discharging. By connecting several modules together, it is possible to use batteries from one module to charge batteries from another module in this case. There can also be a small heater in the battery compartment for geographic locations that are extremely cold.

Load Shedding:

The way this is controlled is via a load shedding (LS) feature that is selected by the user. There are a minimum of two power outlets (or receptacles) at the module(s), and preferably at three power outlets (or receptacles). The priority or each receptacle is indicated to, and known by, the user in advance, and the user plugs-in/connects the loads accordingly depending on the user's perception of the importance/priority of the loads. For example, if there were three receptacles and levels of load shedding ranked as A—Highest importance to C—Lowest priority loads, the user would determine the load importance/priority and plug-in/connect them accordingly to the receptacles. The, in the event of a shortage of solar/battery power, the LS system would "shed" the lowest priority loads first by disconnecting (turning off a switch or relay) the C receptacle. All loads plugged into this circuit would be turned off if the stored power dropped below a preset level. After turning off load C, the second level would turn off the B loads before the highest priority loads were at risk of being turned off.

Under normal conditions, all three circuits would be fully operational. In addition to the circuit management explained above, there are also lighting circuits that could be dimmed to conserve energy. Any and all of the circuits (A, B and C) can be programmed as dimming circuits, and the dimming parameters can be pre-set to dim as required when energy needs to be conserved.

LED indicators at the control unit show the system status. For example, if all circuits are fully charged and operational, the LEDs would show a Green illuminated LED for circuit A, Yellow for B, and Red for C. In the case where load shedding is occurring, a flashing LED shows that it is in transition, and once circuit C is turned off, the Red LED would no longer be illuminated.

Interconnection of Modules:

The interconnection of the modules can be done primarily over the AC system or alternatively over the DC power system wiring. The preferred method is to have both AC and DC wiring systems shared between the modules.

DC Shared Connections (FIG. 7a):

This allows for sharing of the stored energy between the modules on the DC system, along with allowing the energy produced from the solar panels to be allocated across several modules for storage as needed. If one module is not collecting enough solar energy to keep its batteries charged, the other connected modules can charge the batteries of any and all batteries within the connected system. The control system determines not only which battery bank(s) within the individual module are to be charged, but also is able to charge battery banks in any of the connected modules.

From a power delivery standpoint, shared DC power between modules allows more energy to be delivered to connected loads, both instantaneous power (in rush current, for example) and total power capabilities are increased according to the number of modules connected together. All energy available can be delivered to any of the connected loads. So if there is only one module rated for 500 watts of power and an instantaneous current maximum of 5 amps, once two of these modules are connected together, they will have double the capacity (1 kW of power and 10 amps current).

With shared DC, a larger inverter can be connected to the system at the primary P or main M module. This, however, is one of the limitations of a DC only system. Since only the DC system is shared, any larger loads require an inverter sized to handle the largest load. Either every module would have its own inverter sized to handle small loads for S type modules and a larger inverter in the P type module, or alternatively only the main or P module would have an inverter and all loads would be served via this main module. In cases of very large systems, the main service outlet(s) would require an inverter that serves both 120 volt and 240 volt loads, and the plug strip would require larger gauge wire along with receptacles for both 120 v and 240 v plugs.

AC Shared Connections (FIG. 7b):

With shared AC wiring across several modules, each inverter is sized to handle the power requirements of each individual module. This allows smaller inverters to be used in each module. Each inverter contributes (in a staged manner as described in the "GRID CONNECTION" section below) to the total power of the system. The power flows from each module to the P type or M type module at the center of the system. The loads are served from the P or M module. This allows all inverters to work together to deliver the higher power and current required by these larger loads. The whole system power is the total combined power of all connected modules. A limitation of having only an AC shared connection is that it is difficult to share the energy storage of interconnected modules. One possible way around this would be to have a battery charger in each module powered from the AC power. Since the AC power is shared over all of the modules in the system, the total available power would exceed that which is needed for some of the modules and therefore could afford to deliver more power to the individual modules in need of more energy to bring their storage back up to normal levels. This requires an additional piece of equipment in the form of a battery charging circuit that adds cost to the system. There are also energy losses in converting the DC from the solar to AC via the inverter, and then back to DC again for the battery charger.

As discussed above, the best features of both systems (sharing both DC and AC power between the modules) drives the design of the preferred system. In preferred embodiment, all interconnections between modules are between BOTH the AC system and the DC system (isolated and separated from each other as shown in FIG. 1, see call-out references DC power 7, AC power 8, and data 9).

Connection of Loads:

The SMPS is equipped with the load shedding capabilities as described above. In a small SMPS with one or a few modules, the power is distributed to the loads via the plug strip as shown in FIG. 1 (see call-out reference 16). Each receptacle can be turned on or off by the control system to allow lower priority loads to be "shed" when the total stored energy drops below a pre-set level.

For a larger SMPS, the connection to the loads served is made via an electrical sub-panel. All circuits that are to be served by the SMPS are connected to the SMPS sub-panel. In an autonomous system (not grid-connected) these circuits are isolated from (not connected to in any way) any and all of the normal grid-connected circuits. When both types of circuits are present, the outlets or receptacles connected to the SMPS are identified (color corresponding to priority levels for load shedding) so that the user can identify which circuits are available for SMPS loads to be plugged into.

Grid Connected System:

Certain embodiments will be provided with a grid-tie, that is, connected to the utility power grid for cooperation with said grid, during at least some periods of time.

On a normal or traditional solar power system with micro inverters, all of the micro inverters are "on" (and turned on and off) at the same time because they are "pushing against" a much higher power system (utility power) that can handle the total produced solar power.

Figure 8A:
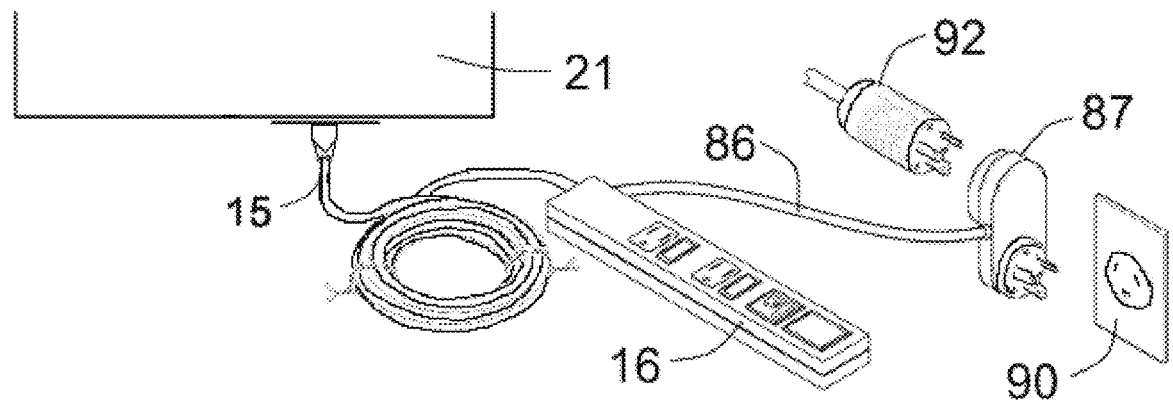
FIG. 8a illustrates how one embodiment of a small SMPS is connected to the utility power grid.
Figure 8B:
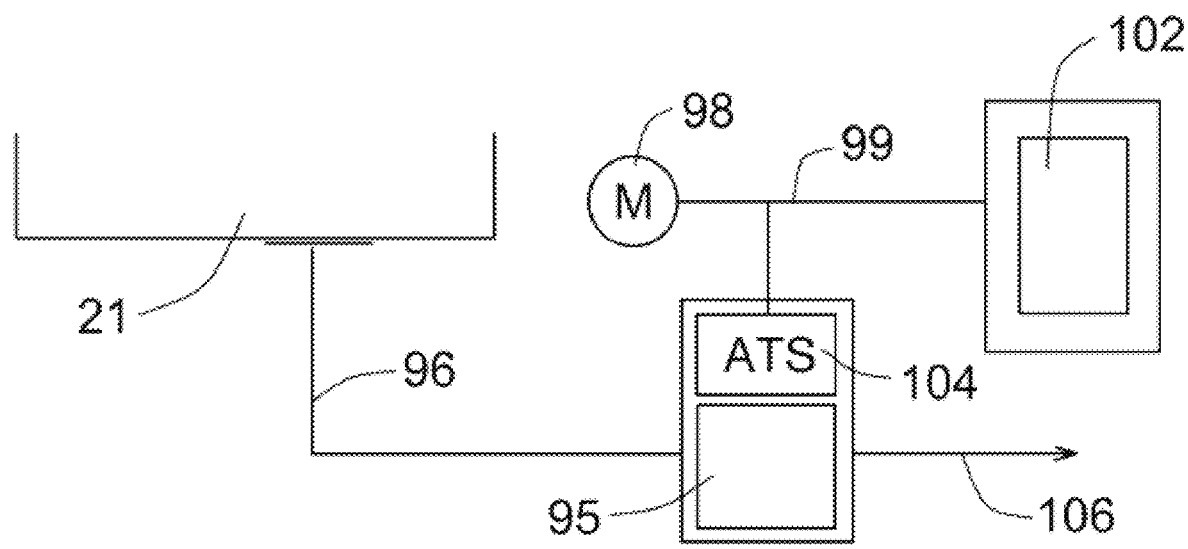
FIG. 8b shows how one embodiment of a SMPS is connected to a sub-panel for power distribution.

Conversely, with the SMPS, only the grid connected module (either P or M depending on the system) is matching the AC waveform of the utility (FIG. 8b). This is used as a reference for the subordinate panels to match to. In addition, the connection of subordinate inverters is staged to allow each module to sync to the main inverter individually, and therefore not placing too much load on the system simultaneously. This allows the control system to confirm that the main or primary inverter can handle each subordinate module in turn, and make adjustments as necessary. The inverter in every module can be turned on and/or isolated from the system as necessary to keep the entire system operating properly. In this way, faults can be isolated and still allow the rest of the system to be fully operational.

This configuration allows the turning on and off of the inverters in an orderly and staged manner when matching the utility AC, both when the grid turns on and when the grid shuts off.

The only inverter that syncs to or matches the utility AC waveform is the main or primary module that is actually physically connected to the utility grid (via a plug in connection or hard wired). This inverter matches the utility's waveform in the same way that a normal grid-tied inverter does. What is different in the SMPS is how the other inverters in the system operate once the main utility connection has been made (or has been disconnected). Each of the subordinate inverters match the MAIN module AC waveform (not the utility). This allows the MAIN module to control the subordinate modules with or without a grid connection.

When the AC signal is lost from the utility (a utility grid power outage), the MAIN module disconnects from the grid via Automatic Transfer Switch (FIG. 8b, note 104) and immediately starts generating it's own AC signal for the subordinate panels to sync to. In this way, the subordinate modules will continue to operate, sourcing their power from the batteries rather than the utility. If the pool of stored energy in the batteries (or other storage device) is not large enough to carry the entire load when the utility connection is lost (during the utility power outage), the control system will shed loads as required to allow the system to carry only the loads on the prioritized circuits as identified.

With a grid connected system as described, the excess power generated by the solar can be pushed out onto the grid once the batteries are fully charged.

Small System Grid-Tied Interface:

Load shedding when small (4 box SMPS) system is tied to an existing grid-tied electrical-circuit:

The connection to the grid by the preferred SMPS is preferably adapted/configured so that when the utility power is off-line, the SMPS is still 100% operational (see discussion above). Since the SMPS is much smaller (1 kW for SMPS connected to a grid-tied 5 kW system), the 5 kWh of storage capacity may only support a small portion of the connected loads of the entire system. The load shedding will determine which loads can be served overnight. It will warn (visual and audible notifications) that another circuit is going to be turned off prior to doing so. In the morning when the sun comes up there will be more than enough power to support all of the circuits, and the SMPS will notify prior to turning on each circuit.

Connection Methods for a Small System (FIG. 8a):

For a small (1-4 module) SMPS, the system is plugged into a grid-connected receptacle. This connects the SMPS to that circuit (less than 15 amps, controlled at the service panel by a breaker, and protected for overload by that breaker or fuse).

A medium size system (5-9 modules) can be connected to the system via an existing large receptacle or outlet. Typically, a household clothes dryer outlet is a higher amperage and voltage. The SMPS would be plugged in to the dryer outlet and an additional outlet would be provided at this interface for the dryer to be plugged into. This provides the interface for the SMPS to connect to the grid (via the dryer receptacle circuit). This dryer receptacle circuit would need to be rated high enough to handle the SMPS. However, most of the SMPS are smaller than the typical dryer circuit. Most dryer circuits are rated at 30 amps and 240 volts which can handle up to 6000 watts (6 kW). A SMPS with 20 modules is capable of about 6 kW (a very large system). If a system larger than 20 modules is to be connected to the same electrical service, then the second part of the system would have to be plugged in to a second receptacle. For example, an existing electric stove and/or electric cooking range could be rated up to 50 amps at 240 volts. In this case (with two SMPS systems plugged into two separate outlets), the first system would need to be the controlling or "main" system, and the secondary SMPS would be subordinate to the main.

All loads served by the small SMPS are plugged into the power strip that allows each circuit to be managed by the control system. Load shedding is done by switching on or off each receptacle in the plug strip. Each receptacle in the plug strip has an indicator light next to it showing whether or not that individual receptacle or circuit is active or not. The color of each indicator light identifies which circuit and which priority each receptacle serves. Lower priority circuits are shed first, keeping the higher circuits active.

Large System Grid-Tied Interface (FIG. 8b)

Load shedding when a large SMPS is tied to an existing grid-tied system works the same as it does for a small system, alerting the user prior to any loads being shed.

The connection to the main service panel can be done in one of three ways:

1. Main module is connected via dryer or 240-volt receptacle as described for a small SMPS. In this case all of the loads are plugged into the plug strip for control of the load shedding.

2. A sub-panel with Automatic Transfer Switch (ATS) is connected ahead of the main service panel. This allows priority loads to be served by this new subpanel. Less important loads remain served by the existing main service panel. All circuits that are deemed high enough priority to be served when the utility power is out are re-routed to this new SMPS sub-panel. The load shedding is done for each of these circuits, and only these circuits will be served when the utility power is out.

3. The main service panel is replaced with a SMPS service panel (with ATS). All of the existing (or new for new construction) circuits are served by the SMPS service panel. All circuits are controlled by the control system and can be shed if required when there is a utility power outage.

When equipped with either a sub-panel (with ATS) or a main SMPS panel with ATS, the system can allow the operation of additional grid powered solar panels (on the same system) to be operational during a power outage. When the grid power goes out, the ATS transfers power to the SMPS which in turn generates an AC signal. This AC signal provides a reference for the grid-tied inverters to sync to. During a power outage, not only the SMPS is operational but all of the grid-tied inverters on the same system would also be operational. This allows more power to be available during the day. Both Grid-tied solar panels and SMPS solar are available during the day, then the energy storage system carries some of the loads (prioritized according to the load shedding) at night.

It may be noted that the term "modular" means that a system is expandable in order to increase the total system power by adding modules, for example, meaning that each module is compatible with the other modules in the system and can be connected (both electrically and mechanically) together. Modules are interchangeable and compatible with each other without any modification, except that, preferably, there are "right" and "left" modules, however, to connect in a manner as shown and described for FIG. 4b and its air flow channels.

Referring Specifically to the Figures:

A single module 100 is shown in FIG. 1, which is fully functional without any other modules connected to it, thus, it is self-contained. The top surface of the module is a solar collector 1 that covers the entire, or substantially the entire, top surface. The enclosure 3 or "housing" is weatherproof and houses all of the electronics and wiring. In order to allow for the expansion of the system by interconnection of multiple of the modules, the module 100 has a mechanical track 5 that allows a second module to be slid into the track and connected to the first module 100. Openings for air flow 6 on the side (preferably a side edge) of module 100 are described in more detail below, regarding FIG. 3 and FIG. 4. There are three electrical connector sections in the track 5 (or "track assembly") providing connection points for each of the electrical systems. The first track section is for DC power 7, the second section is for AC power 8, and the third is for data/control 9. Each of these track sections have a conductive section/electrical fitting 12 that physically mates to the adjacent module connecting the circuiting between the two modules. See FIG. 3*a*. The external power receptacle 14 is on the bottom face of the corner wing, as shown in FIG. 1. This allows the outlet and plug to be protected from the weather. The extension cable 15 consisting of power and data wiring is plugged in to the receptacle and extended to the electrical loads to be served by the system. Plug strip 16 with receptacle 17 and indicator light 18 identifies which priority each receptacle is for load shedding. While one receptacle 17 and one indicator light 18 are called-out in FIG. 1, one may see three pairs of receptacle 17 and light 18 along the length of the strip 16. Digital display 19 readout shows system information. USB outlet and RJ45 port 20 for connection of data control cable.

Figure 2:
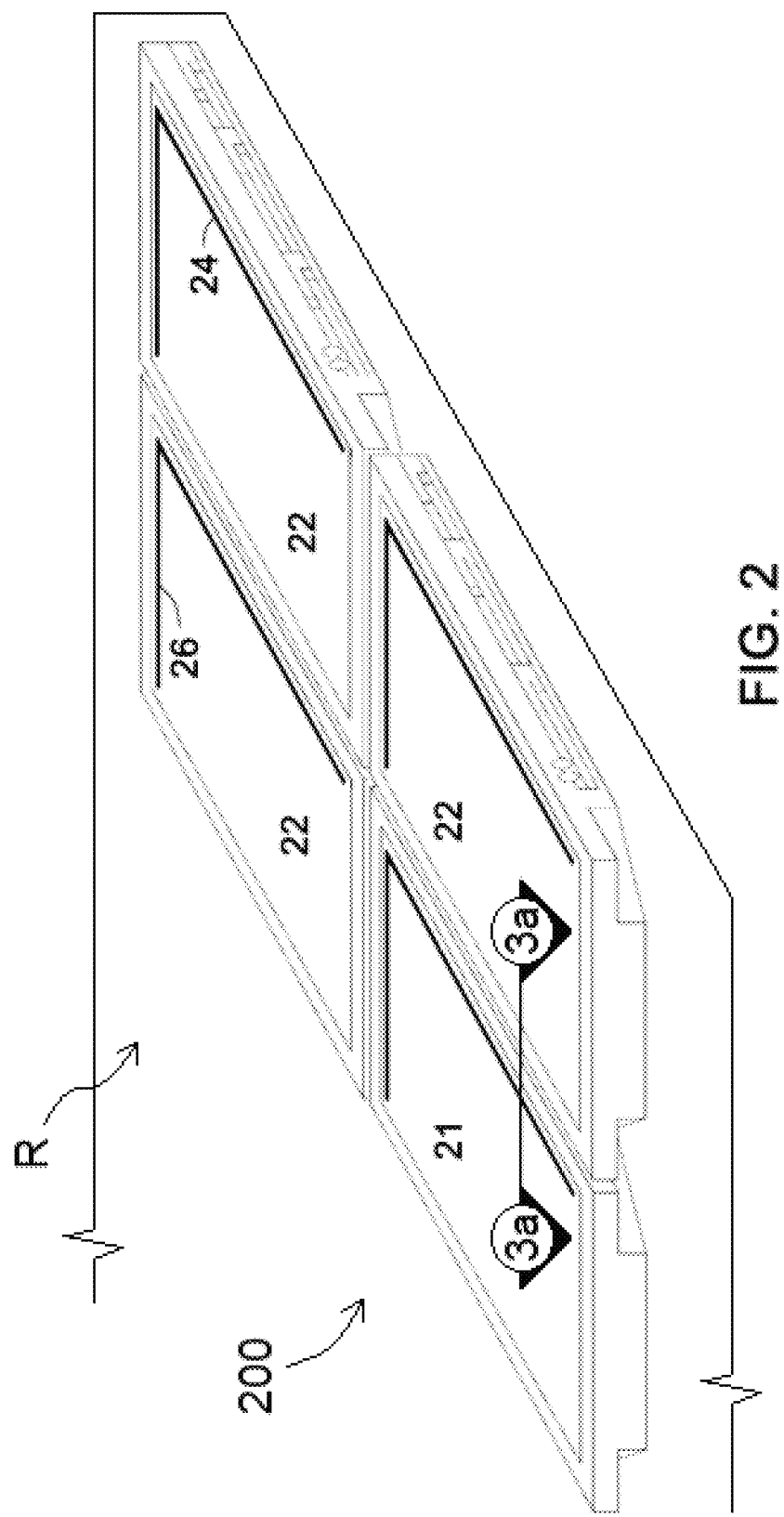
FIG. 2 is a perspective view of another embodiment of the invention, an array of several of the modules of FIG. 1 connected together.

FIG. 2 illustrates an example of a system 200 with four modules, including one "primary" module 21 connected to three other "secondary" modules 22. Each module has conductive bussing running the length of each interior side of the module 24, and along the interior top and bottom walls 26. Section "A" shown in FIG. 2 is detailed in FIGS. 3*a* and *b*.

Figure 3A:
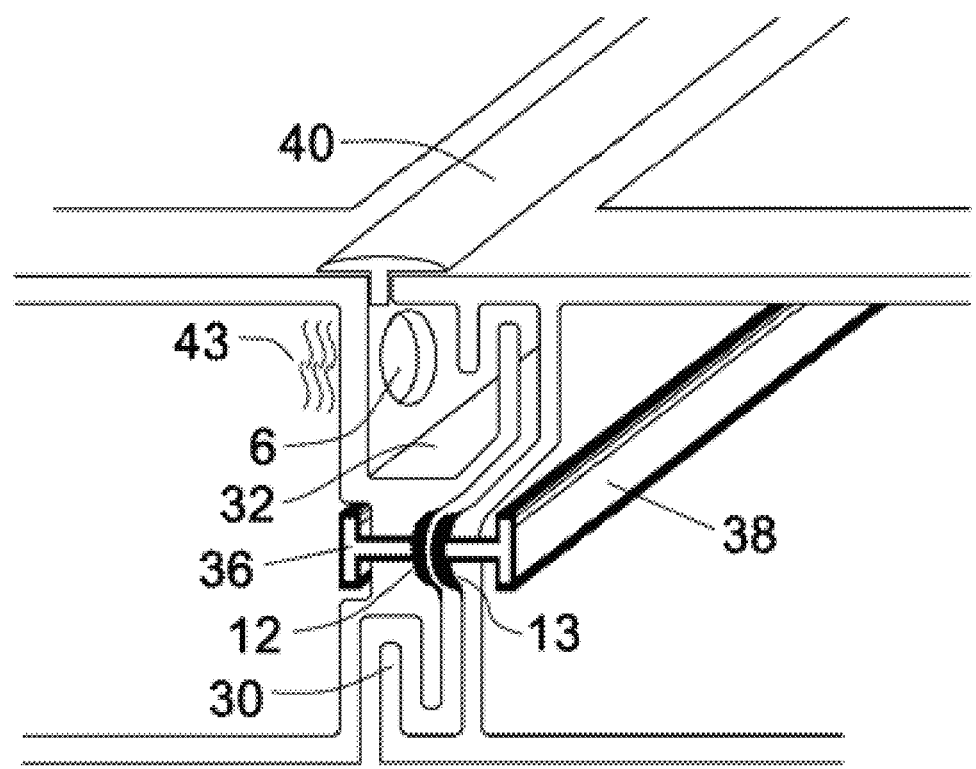
FIG. 3a is an enlarged cross-section view, along the line 3a-3a in FIG. 2, of one embodiment of a connection between two adjacent modules.

The cross-section of the interface (here, "interconnection" including mechanical and electrical connection) between two adjacent modules is shown in FIG. 3*a*. The mechanical track 30 of FIG. 3*a* is configured to provide a mating channel to slide the two modules together. As the modules are slid together along the channel track, and as the connection points 12 for the primary module, and connection 13 for the secondary module come into alignment, they will contact each other and make the electrical connection once the track travel has fully seated and come to a stop. The bus bar 36 in the primary module is connected to the bus bar 38 in the secondary module via this connection. The top section of the channel has an airway trough 32 to provide an airway for venting of the interior of the modules. Each module has a hole or opening 6 on the sidewall of the enclosure to allow hot air to exit the enclosure and ventilate the air thru the channel and out the top of the channel. Passive heat transfer from the interior of the module to the outside air will occur as the heated air is drawn upward to the top of the channel and vented out. The bus bar 36 in the primary module is connected to the bus bar 38 in the secondary module via this connection. Weather-strip 40 protects the channel from water entry. Whatever little water or moisture that may enter the channel will flow down the bottom of the airway trough 32, and drain out the bottom. Screen 43, against/over opening(s) 6, protects the entrance of the module from insects and debris, and only allows air to flow thru the opening.

Figure 3B:
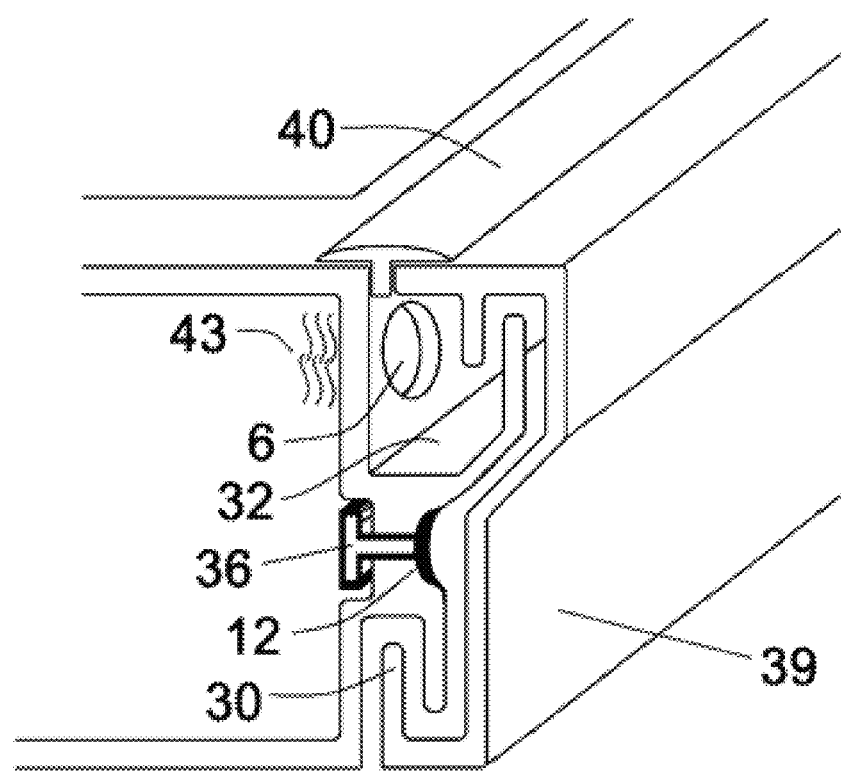
FIG. 3b is an enlarged cross-section view, viewed along 3b-3b in FIG. 4b, of one embodiment of a side edge of a module that is not adjacent to another module, with a channel cover that is slid onto that side edge to cover and protect said side edge and its electrical elements.
Figure 4B:
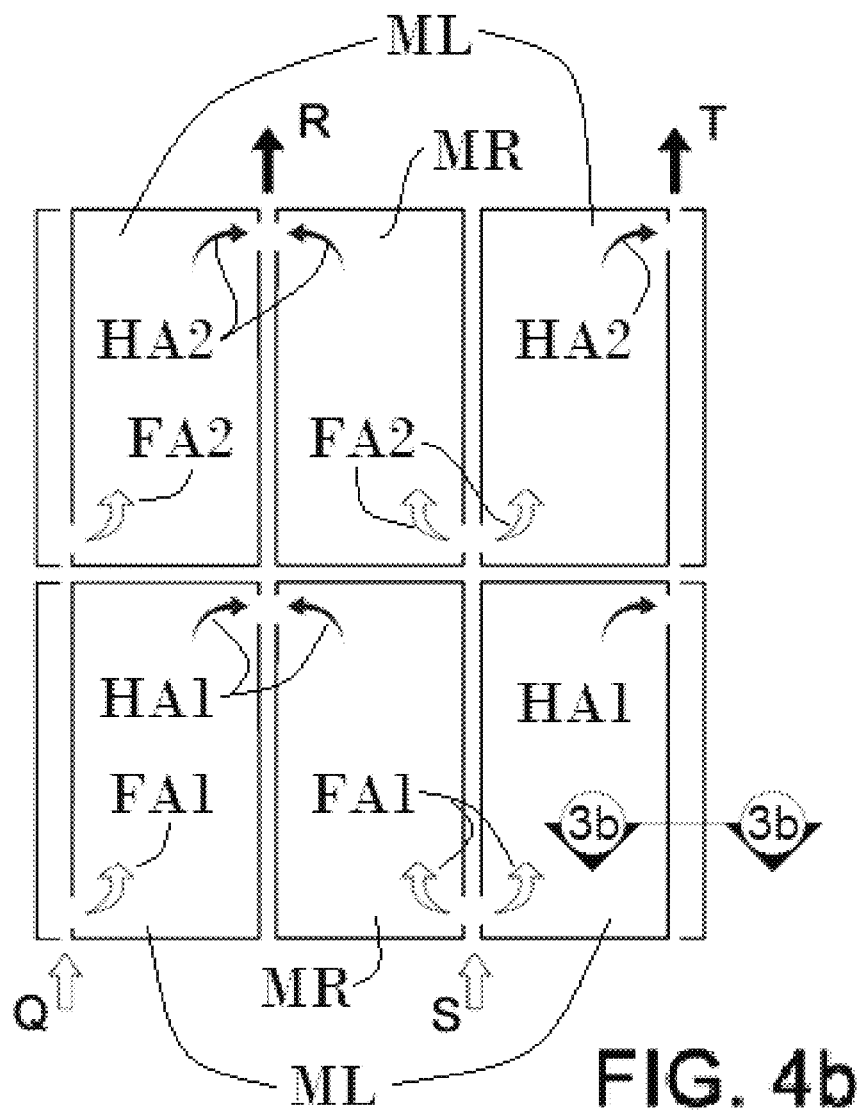
FIG. 4b is a top view of six modules connected into an assembly, schematically showing cool air flowing into the lower ends of preferably all the modules, and relatively hot air existing the upper ends of preferably all the modules, so that hot interior air from each module does not travel through any other module before exiting to the environment of the assembly.

As shown in FIG. 3*b*, a channel cover 39 is slid onto module sides ("side edges") that are not adjacent to another module, for example, for an "outer" module such as shown at view line 3*b*-3*b* in FIG. 4B. This provides a channel for the air flow, and protects the channel, including it electrical elements, from the weather. The channel cover runs the length of the channel along the side of the module.

FIG. 4*a* is a schematic view of a module, with its top solar panel removed, and illustrating only the inverter 42 and fan(s) 44 inside the interior space I of the module enclosure. Openings 33 and opening 34 (see also openings 6 in FIGS. 1, 3*a* and 3*b*) are at opposite ends of the module. In many embodiments, the orientation of the module on a slanted roof/surface will place the openings 33 (and the respective "top end" of the module) higher in elevation relative to openings 34 (and the respective "bottom end" of the module). Given such an orientation, FIG. 4*a* demonstrates an example of how the airflow travels thru a single module to ventilate heat from the interior I of the enclosure to the outside. Hot air inside the module rises to the top of the enclosure and is drawn to the outside thru the upper opening(s) 33 at the top end of the module. Cooler air from the outside is drawn in from the bottom of the enclosure thru the lower opening(s) 34 at the bottom end of the module. Heat from the solar panel at the top side of the enclosure, along with additional heat from the inverter 42 and other electronic components (not shown in FIG. 4*a*) will contribute to this process. In addition to the natural convection of heat, and/or if the orientation of the module is less slanted, fan(s) 44 increase the air flow and assist in the heat transfer thru the enclosure.

FIG. 4*b* illustrates how the airflow channels/passages may be established for air travel in a network/assembly of modules. Some of the modules (ML) have their fresh air openings on lower, left side edges, and other of the modules (MR) have their fresh air openings on lower, right side edges, with the hot air openings at the opposite side edges of each module. Therefore, a column of ML modules will be connected to an adjacent column of MR modules, next to another column of adjacent ML modules; this forms, from left to right in FIG. 4*b*, a fresh air channel Q at the far left, a hot air channel R, another fresh air channel S, and another hot air channel T. In other words, fresh air channels (Q and S) alternate with hot air channels (R and T). Thus, fresh air enters into the lower ends/corners of the modules at channels "Q" and "S" (at the side edges of the modules were are located the fresh-air openings). See fresh air arrows FA1 to the lower three modules, and also fresh air arrows FA2 to the upper three modules. Thus, the hot air tends to leave the modules (see arrows HA1 for the lower modules, and arrows HA2 for the upper modules) from the upper openings, flowing into channels "R" and "T" and then out of those channels on the upper end of the module assembly. The hot air is drawn generally from the lower/bottom end of the assembly, to the upper/top end of the assembly, and, hence, to the top outside air. Specifically, the hot air exiting from each module flows into the channel along the end-to-end length of each of the modules, and flows through the channel toward the top end of the assembly of modules, to exit to the ambient air. This way, each channel maximizes the efficiency of the heat transfer, since hot air from one module will not enter another module on its way to the outside. The air entry point 34 of each module is at/near one end and one side edge of the module, and the air exit point 33 is at/near the opposite end and opposite side edge of the module, allowing the airflow to go across the entire surface area and volume that needs to be ventilated (along the entire or substantially the entire length L between said opposite ends, and across the entire or substantially the entire width W between the opposite side edges). Refer to FIG. 4*a*. In certain embodiments, this air does not flow through the battery chamber, but instead bypasses or is otherwise blocked from doing so. Channel cover 39 provides such a passage for the air flow on channel side edges not adjacent to another module; refer to FIG. 3b. It may be noted that the left and right side edges of the modules in a given row of the assembly in FIG. 4b are connected mechanically and electrically by the channels/tracks, as described herein, while the rows of modules may be connected together mechanically, by various fasteners for example, at their top and bottom side edges, if desired.

Figure 5A:
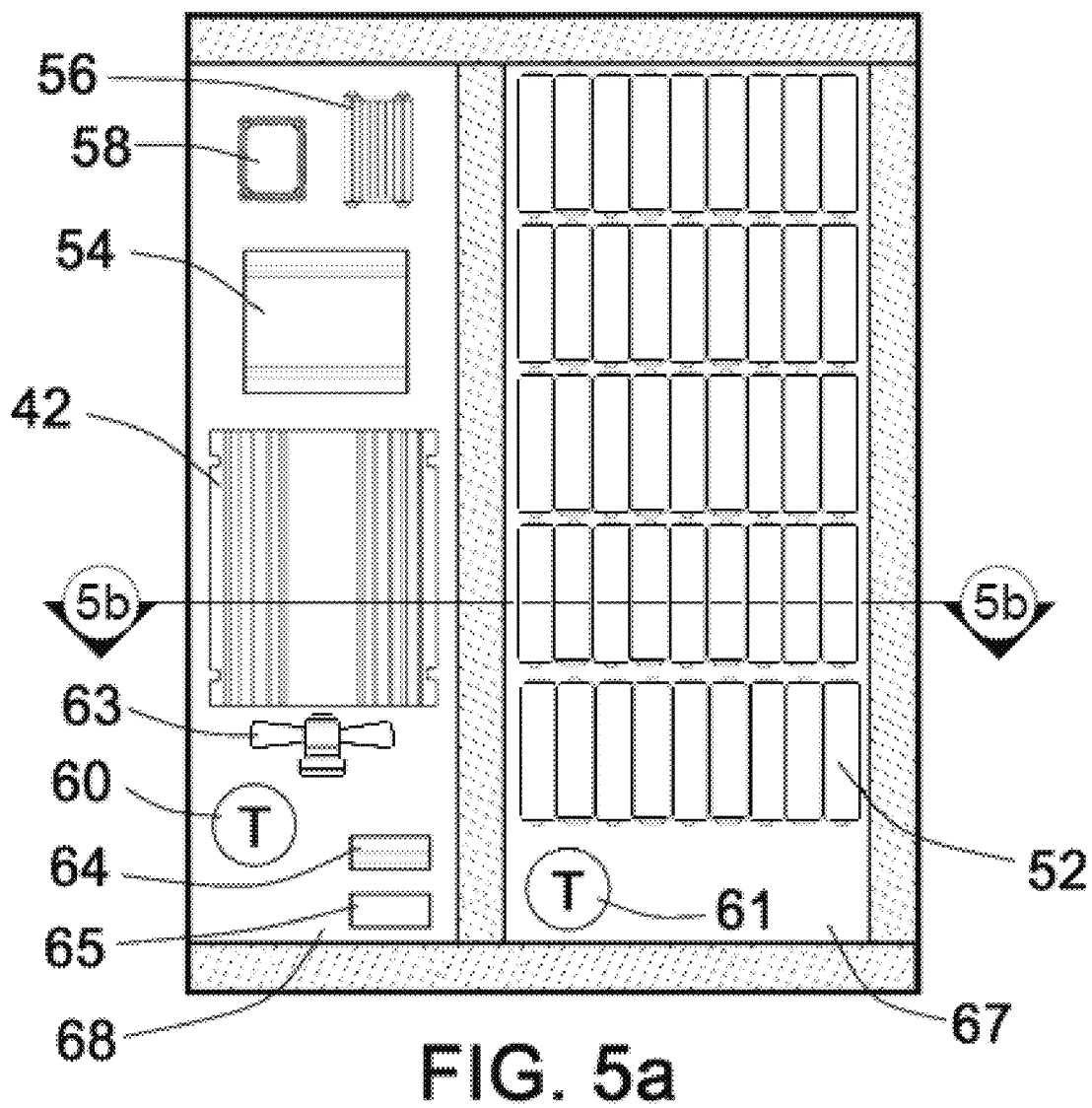
FIG. 5a shows the interior of the module of FIG. 1 with all of the preferred components shown.

The interior of the module, with all of the preferred components contained therein, is shown in FIG. 5a. The inverter 42 is adjacent to the batteries 52 and is separated by insulation. All of the electrical components are in a separate compartment from the batteries. This provides a thermal barrier to protect the batteries from the heat of the electronic components and the solar panel. Examples of the preferred Maximum Power Point Tracker (MPPT) 54, Charge Controller (CC) 56, Control System (CS) 58, Electronics compartment temperature sensor (T) 60, Battery compartment temperature sensor 61, AC circuit protection and control 64, DC circuit protection and control 65, Battery compartment 67, and Electronics Compartment 68, are illustrated, and it will be understood from this document and the drawings, combined with the average skill in the art, how these elements will be connected and operated.

FIG. 5b is a cross section of the enclosure illustrating the heat transfer and insulating features of the system. The inverter 42 is sitting on and thermally connected to the conductive plate 51 that provides pathway for heat transfer to the batteries 52. The batteries are insulated on all sides 50. There is a dead air space 53 above the entire solar panel 1 that provides a passageway for the airflow from the intake and exit holes in the sidewalls of the enclosure. This airspace keeps the back side of the solar panel cool, and prevents excess heat from entering the enclosure.

Figure 6A:
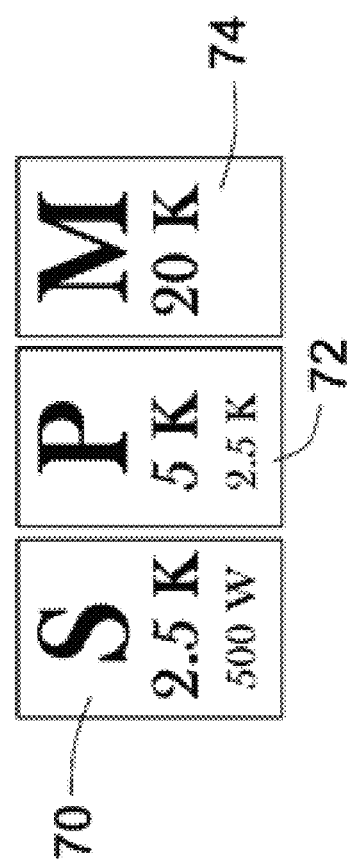
FIGS. 6a-c are diagrams that show three different array configurations to illustrate certain ways various modules can be connected together.
Figure 6B:
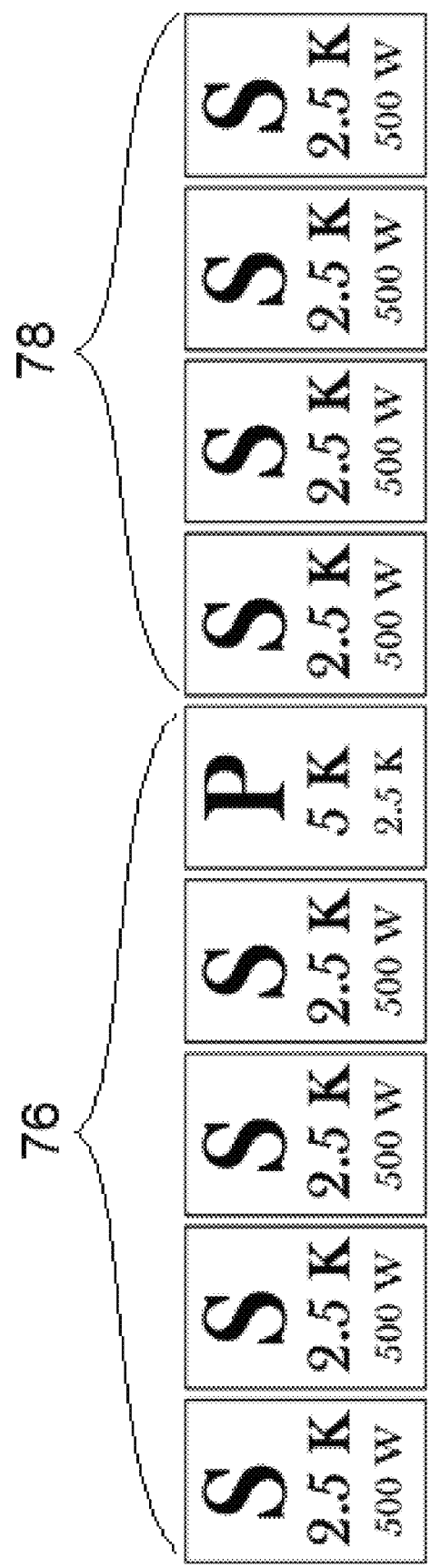
Figure 6C:
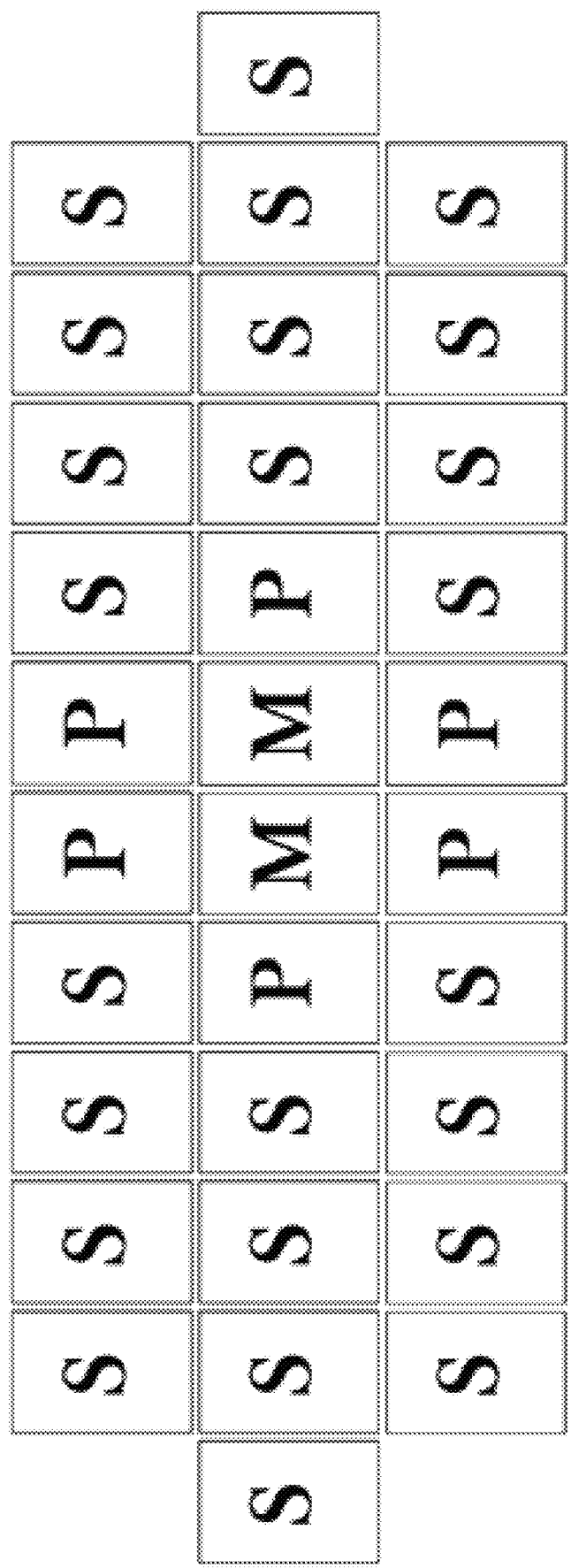

The simplest system consists of just one module; said just one module must be a "P" type, or "primary module" (PM) so that it can communicate to the CS and provide all of the required functions. More complicated systems may comprise, consist essentially of, or consist of multiple modules connected mechanically and electronically into module assemblies. FIGS. 6a-c Illustrate the various types of modules and some, but not all, examples of how multiple modules may be connected together. The additional modules, over and above said just one module, can be connected to the P as secondary or subordinate "S" type modules (or subordinate modules (SM)). The S modules rely on the P for control and interface to the CS. For the case where a system is larger (more power) than that which a P plus S system can handle, then an additional "M" or "main module" (MM) can be added to connect multiple P modules. In this case, the entire system control is thru the M, with all of the P modules being subordinate to the M.

The row of modules in FIG. 6a shows the ratings of each of the preferred module types. The S module 70 has a local rating (for the individual module) of 500 watts, and a system rating of 2.5 kW. The system rating indicates that S can be placed within a network of modules up to 2.5 kW. The P module 72 has a local rating of 2.5 kW (for the local network with its subordinate S type modules), and a system rating of 5 kW. The M module 74 has a system rating of 20 kW.

The row of modules in FIG. 6b illustrates an example of a P module connected to four S modules on each side of the P module. A first set 76 of modules, therefore, may be said to be the four S modules on the left, plus the primary module P. A second set 78 of modules may be said to be the four S modules on the right that connect to P parallel to the S modules of the first set 76. Since each S module can have up to 500 watts of production and consumption, the combined total power of all five modules (the P module plus four modules on one side of the P module) is 2500 watts, consistent with the local rating of 2.5 kW of P. Note that there are four additional S modules, each rated for 500 watts (0.5 kW), on the other side of the P module, for a total of eight S modules, which is 4 kW total. The P module only adds 500 additional watts to the total, for a total 4.5 Kw, with 5 kW being the total system rating (see the 5 kW system rating for P).

In FIG. 6b, it may be noted that the 2.5 kW is the "local" rating of P (only for the individual module itself), so if there were a P module with no other connected panels it could handle up to 2.5 kW in local loads (loads that are plugged directly in to the P module). The S modules can handle up to 500 watts in local loads, and up to 2.5 kW shared loads (if in a system as shown). Therefore, S modules are shown in FIG. 6b on either side of the P module, with 4 on each side. If 8 modules were on one side of the P module, the total connected load would exceed the 2.5 kW rating. Since there are only 4 S modules in series (four on either side of the P), any one of the individual S modules will never experience more than it's rating of 2.5 kW.

The rows of modules in FIG. 6c indicate how each of the P modules serve four S modules, and in turn feed into the M module. Each M module serves 3 P modules at 2.5 kW each for a total of 7.5 kW. Since the M module is rated for 20 kW, this configuration is well within the ratings of this example.

Figure 7A:
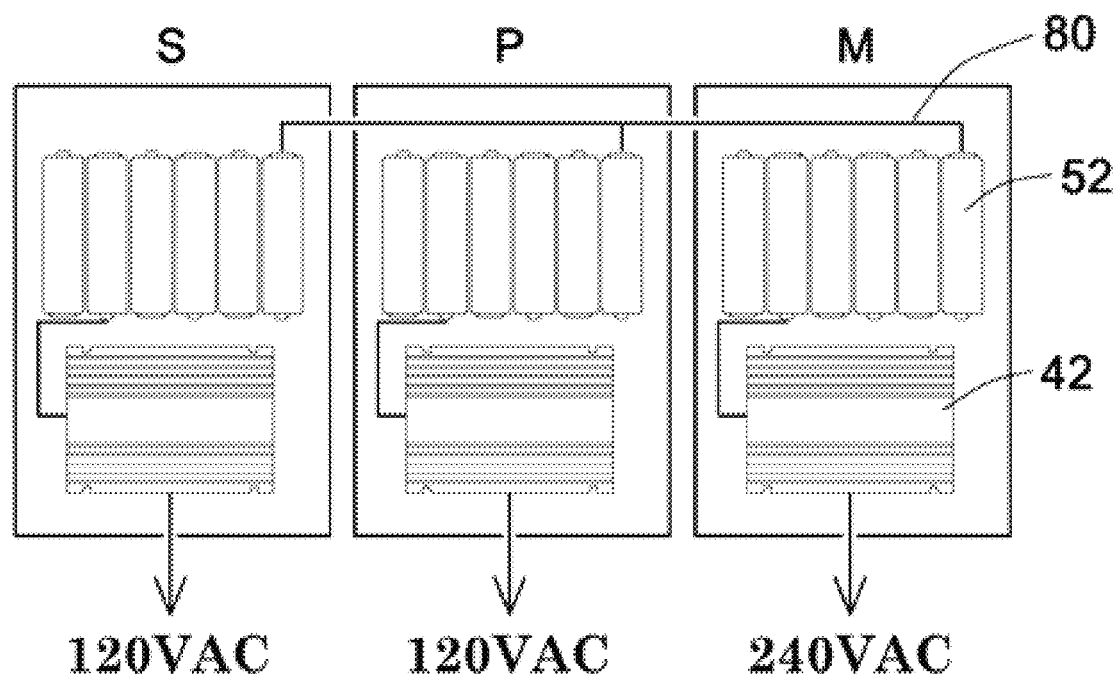
FIG. 7a is a schematic diagram of several modules connected together with DC power as the main combining feeder circuit.

FIG. 7a illustrates the connection of modules via DC power 80, sharing the power by connecting all of the batteries 52 of the 3 modules (S, P, and M modules) in parallel. The inverter 42 of each module draws from this pooled or shared energy storage system as needed to serve their individual loads. Note the 120 VAC from modules S and P, and the 240 VAC from module M.

Figure 7B:
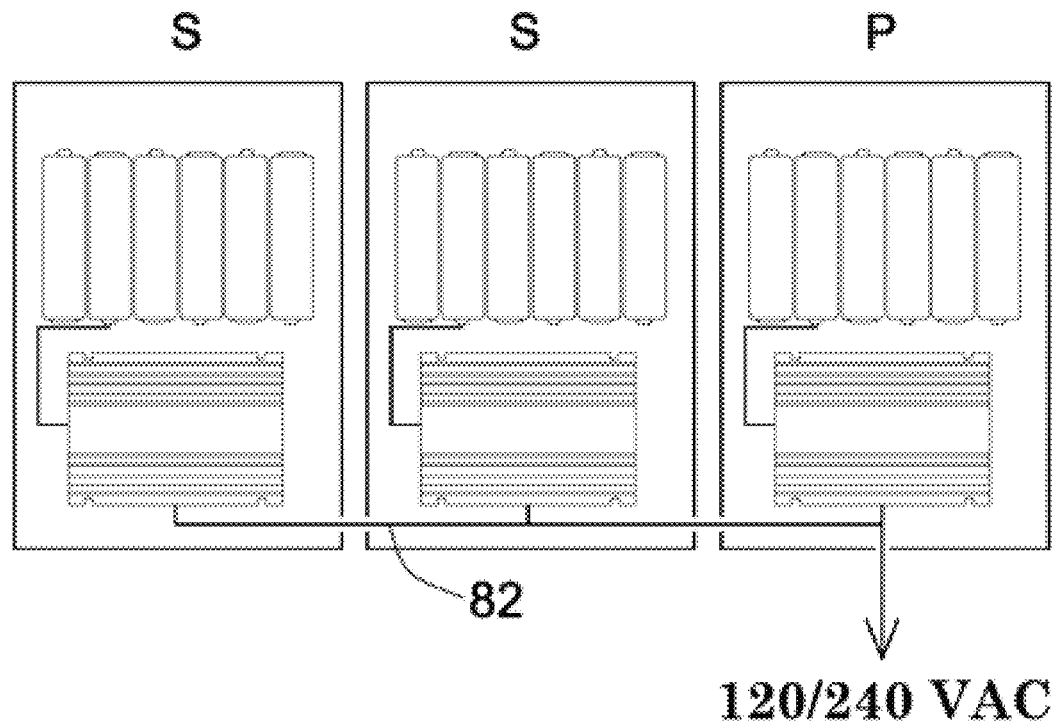
FIG. 7b is a schematic diagram of several modules connected together with AC power as the main feeder circuit.

FIG. 7b illustrates an AC shared connection, where the AC wiring 82 is shared, and all of the inverters operate in parallel. In this configuration, the subordinate inverters sync to the primary inverter in module P, as discussed earlier in this document. FIG. 8a illustrates how a small SMPS is connected to the grid. Extension cable 15 extends power from the primary module 21 to the plug strip 16 which feeds a plug/receptacle 87 via extension cable 86. The plug 87 plugs into the wall receptacle 90 which is connected to grid power via the electrical service panel. Plug 87 also has a receptacle on the back side which allows the dryer or other electrical appliance plug 92 to be plugged into the receptacle 87.

FIG. 8b shows how the SMPS is connected to a sub panel for power distribution. The primary module 21 provides power via power cable 96 to sub-panel 95. This sub-panel is connected to the utility power via connecting service line 97 to the line or bussing 99 ahead of the main service panel 102 and after the meter 98. The Automatic Transfer Switch 104 senses when there is a utility power outage and isolates the SMPS from the utility power. Line 106 indicates loads served by the SMPS. Loads served by sub-panel 95 are served by the SMPS when the grid is down.

Figure 9:
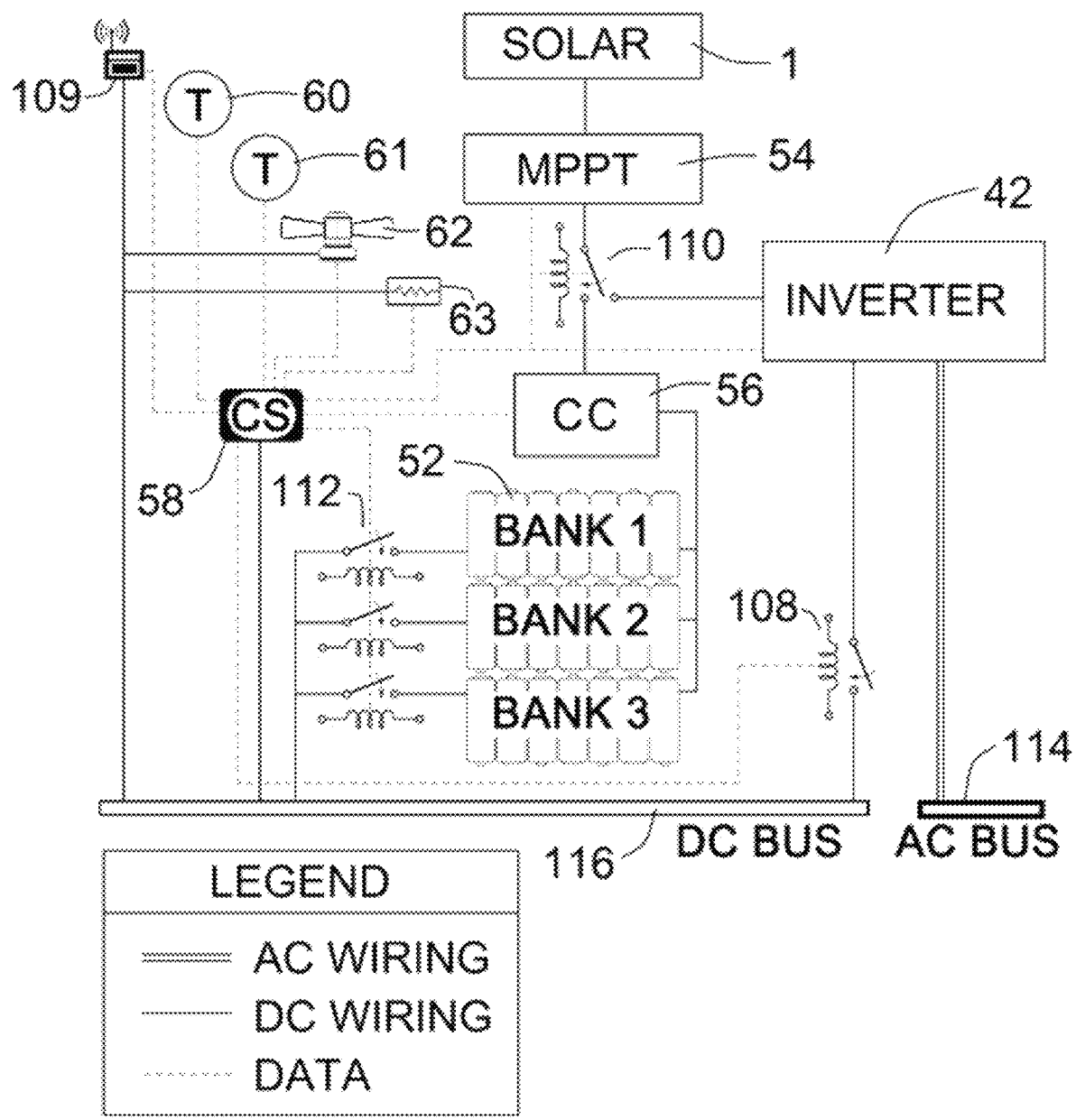
FIG. 9 is a wiring diagram of one embodiment of an individual module.

FIG. 9 is a wiring diagram of an individual module. The solar panel 1 is connected to the maximum power point tracking (MPPT) device 54 which is connected to either the charge controller 56 when charging the batteries, or to the inverter 42 when the inverter is called to serve directly from the solar power to the connected AC loads by the control system. Relay 110 allows the control system to make this switch. The charge controller 56 charges the batteries 52, and each of the battery banks can be isolated from the DC power bus by relays 112. The control system 58 controls all of the system devices as shown including the MPPT 54, inverter 42, charge controller 56, electronics temperature sensor 60, battery temperature sensor 61, fan 62, and heater 63. The batteries deliver power to the DC power bus 116 that provides power to all local devices, and is also connected to adjacent modules as described in FIG. 1 and FIG. 2. The inverter 42 delivers AC power to the AC power bus 114 which also connects to adjacent modules as required. Wireless device 109 connects to the control system to allow remote wireless monitoring and control of the system. Relays 108 and 110 allow the inverter to be isolated from the system.

Certain embodiments of the invention may be described as a solar modular power system, preferably for installation on a roof or other elevated location that receives solar insolation. The preferred system comprises multiple modules each having photovoltaic cells/panel(s), wherein a certain type of module (a primary module) is designed so that it can operate on its own, as a single, self-contained solar module providing AC or DC and preferably both, to one or more loads. The primary module, in addition to a solar panel(s) and elements to produce AC, DC, and preferably both AC and DC power, also comprises control and/or monitoring and/or communication/wireless apparatus for the entire assembly (the entire "system"). Additional, subordinate module(s) may also be provided for mechanical and electrical attachment to the primary module, to increase AC, DC, or preferably both AC and DC power production. Therefore, preferably each module (both primary and subordinate) is designed to connect to and work with other modules, for higher power output, by means of each module being adapted to work at the full power rating of the entire assembly (entire system). Therefore, up to a predetermined number of subordinate modules may be connected electrically in series to the primary module, and preferably also mechanically connected, to be secured into single structural unit. Further, in certain embodiments, multiple of the primary-module-plus-subordinate-module assemblies (P plus S assemblies) may be connected in parallel to a main module, that may comprise additional of said control and/or monitoring and/or communication/wireless apparatus for the entire assembly (entire system of two or more P plus S assemblies connected to M).

In the assemblies/systems of the above paragraph, each module preferably comprises a module housing that holds the solar panel(s) on one or more of its surfaces (preferably on a top, broad and flat surface), wherein the solar panel(s) may be of any type such as a flexible solar panel or rigid solar panels or cells, and of any composition currently known or developed in the future. The module housing contains in its interior space the other elements needed for the module operation, control, and protection, wherein the housing is further adapted to include ports for required operative connections (via the "outlets" or other electrical connection sites) to other modules and/or to loads. The modules, therefore, may be described in many embodiments as separate boxes, all of the same or approximately the same dimensions, that can be stacked in a courier-approved-size package, and shipped to a user. Then, the modules may easily be placed on a roof or other support and connected together and made operative without significant knowledge except to read instructions included with the package. Preferably, the connection is a convenient slide-together or snap-together connection that serves both mechanical and electrical connection, but, alternatively, the modules may be mechanically connected together by fasteners, clips, plates, racks, or other connectors, and plug-in wiring may be used to make the electrical connections.

The elements in and on each module for operation of each module of the above two paragraphs may comprise, consist essentially of, or consist of, elements to generate and store solar energy, and to provide DC, or AC, and preferably both DC and AC power, to a load(s) that is/are outside the module but electrically connected (typically plugged into a receptacle) to a power outlet of the module or to a power outlet of the system/assembly of modules. Said elements in each module may include the solar cells/panel(s) (such as photovoltaic cells/panel(s)), one or more batteries or other energy storage devices, a Maximum Power Point Tracker (MPPT) such as one available commercially and understood in the art, a charge controller (CC), a control system (CS), relays to isolate the battery/storage-device from the DC power bus, an inverter delivering AC power to an AC power bus (which can also be connected to adjacent modules as required to increase the total AC power output of the combined system) to directly provide energy from the solar power to the connected AC load(s) via the control system (and a relay to allow the control system to make this switch), an electronics compartment temperature sensor, a battery/energy-storage compartment temperature sensor, fan and/or heater, AC circuit protection and control, DC circuit protection and control, and a wireless device connected to the control system to allow remote wireless monitoring and control of the system. Certain embodiments may comprise, consist essentially of, or consist of, the elements schematically portrayed in FIG. 9. These elements will typically be separated to be contained within a battery compartment, and an electronics compartment, inside the housing of the module.

These elements, of the previous three paragraphs, are provided and operationally connected, when multiple of the modules are connected into the multiple-module system, so that each individual module is able to collect (via the solar panel), store (in batteries or other energy storage system) and deliver to external loads the energy collected by the solar panel, with the capacity to handle a total higher load than just one module. Said elements of the module and their particular operational connection are important because each module of the system must be: 1) compatible with the other modules (mechanically and electrically), and 2) have a power rating high enough to handle all of the power over the entire system, and 3) have a control system to manage the power (since it is shared over the entire system). Regarding the item no. 1 compatible electrical operational connections, it is necessary to electrically connect both the AC wiring of each module to the AC wiring of the other modules in a given series of modules, and the DC wiring of each module to the DC wiring of the other modules in a given series of modules, and to keep the AC wiring and the DC wiring isolated from each other (as described in detail in this document and the figures). Regarding the item no. 2 power rating for each module being high enough to handle all of the power over the entire system, this is important because: a) one cannot combine multiple systems or modules unless the total system is capable of supporting the combined loads, b) the combined loads vary depending on how many modules are connected together, and c) the modules and their operational connection must be designed to accommodate this variance. Regarding the item no. 3 control of operational connection, the system comprises a control system and (preferably wireless) communication to a control station/ unit, to manage operations of each module ("in-box" or "within a given module") and also of the system as a whole (that is, control of functions "out of the box", that is, "between modules of the system" and "between the system and the loads"), for example, energy storage in the batteries/ energy-storage and load shedding. Load shedding on the load side of the system allows energy management that conserves power when the energy storage system (batteries or the like) is low. Further, the preferred control of the system as a whole further comprises control/adaptations to match the utility grid AC waveform, specifically in certain embodiments, the system comprises the ability to match utility AC power waveform with the main inverter, and then to sync additional inverters (of subordinate modules, for example) to the main inverter (of the primary module, for example).

Certain embodiments as described in the four paragraphs immediately above, may comprise grid-connection with ability to serve connected loads with grid-power. This allows "back-up" power if the batteries ever get too low (alternative to load shedding). This may also allow a back-up in the case of any other failures within the module that may prevent its operation (for example, inverter failure).

Certain embodiments, such as those described in the five paragraphs immediately above, may include one or more of the following features:

a) a mechanical channel or track to mechanically and electrically connect modules;

b) air flow to allow cooling of interior of module enclosure(s), which air flow may in certain embodiments be through said mechanical channel or track;

c) passive heat transfer from inverter to batteries for cold weather;

d) optional heating unit for heating batteries in extreme cold climates;

e) insulated batteries;

f) phase change material to even out the temperature swings;

g) light weight energy storage system such as LiFE PO4 batteries or ultra-capacitors;

h) control system (CS) including energy management system i) MPPT shared by both inverter and charge controller (which saves manufacturing costs); and/or j) optional cooling fan controlled by CS.

Certain embodiments, such as those described in the six paragraphs immediately above, may include one or more of the following features:

a) the total system is preferably organized with a hierarchy of a "primary" module that serves multiple subordinate or "secondary" modules;

b) primary modules may be connected to one "main" module that serves multiple primary modules with their attached subordinate modules;

c) the control system controls not only the local module specific functions, but also controls and manages the power between modules and over the entire system, and, hence, also the power available from the entire system;

d) the CS isolates faults from the system, for example, disconnecting individual battery banks, disconnecting faulty solar panels, disconnecting and isolating faulty inverters; and/or e) the CS interconnects all of the systems of the combined modules that allows the entire system to operate as a whole, for example, wherein the energy generation systems (solar) can charge any and all of the energy storage systems within the entire system, so that the combined energy storage can serve any and all connected loads.

Certain embodiments, such as those described in the seven paragraphs immediately above, may include one or more of the following features:

a) automatic transfer switch to allow isolation or "islanding" of the system when there is a power outage, which makes it possible for the system to be fully operational when the grid is down; and b) providing AC signal to the local system, isolated by the ATS during power outage for reference to other solar grid-tied inverters allowing their operation during a power outage.

Certain embodiments may be described as: A solar powered modular system comprising:

a plurality of modules, each comprising a housing, a solar panel on at least one outer surface of the housing that is adapted to produce power from solar insolation, a DC system comprising an energy-storage device, a charge controller that controls charging of the energy-storage device from energy produced by the solar panel, DC wiring and a DC outlet, and an AC system comprising an inverter connected to at least one of the solar panel and the energy storage device, AC wiring, and an AC outlet; each of the plurality of modules being electrically connected in parallel to form a module assembly for connection to power one or more electrical loads; wherein the DC systems of the modules are electrically connected in parallel, and the AC systems of the modules are electrically connected in parallel; and wherein each of the modules has a full power rating equal to or greater than a sum of maximum power production of each of the electrically-connected modules, so that the module assembly is adapted to be connected to, and to power, said one or more electrical loads that total to be a higher total load than each of said modules is adapted to power individually. Therefore, in certain embodiments there may be subordinate modules operatively (electrically) connected in parallel to a primary module that comprises control capability, wherein all the modules of such an assembly are preferably in parallel; and, in certain embodiments, multiple of such primary modules (with the connected subordinate modules) may be connected in parallel to a main module that has further control capability, wherein all the modules of such an assembly are in parallel.

Certain embodiments may be described as:

A solar-powered modular system comprising:

a first set of modules, each comprising a housing, a solar panel on at least one outer surface of the housing that is adapted to produce power from solar insolation, a DC system comprising a charge controller that controls the power flow of the DC system, DC wiring and a DC outlet, and an AC system comprising an inverter connected to at least one of the solar panel and the energy storage device, AC wiring, and an AC outlet; each of the plurality of modules being electrically connected in parallel to form a module assembly for connection to power one or more electrical loads; wherein the DC systems of the modules are electrically connected in parallel, and the AC systems of the modules are electrically connected in parallel; and wherein said first set of modules comprises one primary module and subordinate modules, wherein the primary module further comprises a control system adapted to monitor and control the DC power system of each of the subordinate modules and the inverter of each of the subordinate modules to maintain an AC waveform generally matching a utility power grid AC waveform; and the solar-powered modular system further comprising a second set of modules comprising subordinate modules that are connected in parallel to said primary module of said first set in parallel to the subordinate modules of said first set, wherein said control system of the primary module is adapted to monitor and control the DC power system of each of the subordinate modules of said second set and the inverter of each of the subordinate modules of said second set to maintain an AC waveform generally matching a utility power grid AC waveform; and wherein each of the subordinate modules of said first set has a full power rating equal to or greater than a sum of maximum power production of each of the first set subordinate modules and the primary module, wherein each of the subordinate modules of said second set has a full power rating equal to or greater than a sum of maximum power production of each of the second set subordinate modules and the primary module, and the primary has a full power rating equal to or greater than a sum of all of the modules of said first set and said second set, so that the primary module is adapted to be connected to, and to power, said one or more electrical loads that total to be a higher total load than each of said modules of the first set and the second set is adapted to power individually.

Although this invention has been described above with reference to particular means, materials and embodiments, it is to be understood that the invention is not limited to these disclosed particulars but extends instead to all equivalents within the scope of the following claims.

The invention claimed is:

1. A solar-powered modular system comprising:
a plurality of modules, each comprising a housing, a solar panel on at least one outer surface of the housing that is adapted to produce power from solar insolation, a DC system comprising a charge controller that controls the power flow of the DC system from energy produced by the solar panel, DC wiring and a DC outlet, and an AC system comprising an inverter connected to at least one of the solar panel and the DC system, AC wiring, and an AC outlet;
each of the plurality of modules being electrically connected in parallel to form a module assembly for connection to power one or more electrical loads; wherein the DC systems of the modules are electrically connected in parallel, and the AC systems of the modules are electrically connected in parallel; and
wherein each of the modules has a full power rating equal to or greater than a sum of maximum power production of each of the electrically-connected modules, so that the module assembly is adapted to be connected to, and to power, said one or more electrical loads that total to be a higher total load than each of said modules is adapted to power individually.

2. The solar-powered modular system of claim 1, comprises a connection to a utility electrical power grid characterized by an AC waveform, wherein one of said modules is a primary module and others of the modules are subordinate modules, wherein the primary module comprises an inverter that synchronizes AC power that is output from the primary module to have a primary module AC waveform that matches said AC waveform of the grid, and wherein the solar-powered modular system comprises a control system that causes the inverters of the subordinate modules to synchronize to the primary module AC waveform so that all the inverters of the module system are synchronized to the utility power grid when the assembly is connected to said grid.

3. The solar-powered modular system of claim 2, wherein, during a utility electrical grid outage or disconnection, said control system maintains the inverter of the primary module and the inverters of the subordinate modules producing AC power in said primary AC waveform, without the grid connection.

4. The solar-powered modular system of claim 1 that comprises multiple power outlets to power multiple of said electrical loads, wherein the power outlets are each assigned a level of importance from low importance to high importance, and the system comprises a control system that, if DC power level in the module assembly is low, turns off one of the multiple power outlets at a time from low importance to high importance.

5. The solar-powered modular system of claim 4, wherein the multiple of said electrical loads are detachably plugged-in to the multiple power outlets so a user selects what load is plugged-in to each power outlet according to a determination by the user of the importance of each load.

6. The solar-powered modular system of claim 1, comprising a connection to a utility electrical power grid, and a control system that draws power from the power grid to charge at least one or more energy-storage devices of the multiple modules, when stored energy in the energy-storage devices drop below a predetermined threshold level.

7. The solar-powered modular system of claim 1, wherein the multiple modules are mechanically connected into a single unit.

8. The solar-powered modular system of claim 7, wherein the multiple modules are mechanically connected by each of the modules comprising a channel/track, wherein the channel/track of each module slidably mates with the cooperating channel/track of an adjacent module to secure the modules together.

9. The solar-powered modular system of claim 8, wherein said channel/track of each module slidably mating with the cooperating channel/track of an adjacent module also electrically connects the modules.

10. The solar-powered modular system of claim 8, wherein each of the modules comprises multiple of said channels/tracks provided on multiple side edges of each module, for mechanical connection on at least two side edges to adjacent modules.

11. The solar-powered modular system of claim 1, wherein the housing comprises apertures for air flow for cooling of an interior space inside the each module.

12. The solar-powered modular system of claim 1, comprising a heat-conductive plate adapted for heat transfer from the inverter to the housing interior for cold weather.

13. The solar-powered modular system of claim 1, comprising a heating unit inside the housing for heating in extreme-cold climates.

14. The solar-powered modular system of claim 1, comprising insulation inside the housing and surrounding electronics within the enclosure.

15. The solar-powered modular system of claim 1, comprising a cooling fan controlled to turn on in response to a temperature sensor.

16. The solar-powered modular system of claim 1, comprising phase change material inside the housing to even out the temperature swings inside the housing.

17. The solar-powered modular system of claim 1, wherein said MPPT is shared by both the inverter and the charge controller.

18. The solar-powered modular system of claim 6, wherein said solar panel of each module charges the energy-storage devices of all of the modules.

19. The solar-powered modular system of claim 6, wherein said energy-storage device of each module provides energy to multiple loads, including loads connected to any of the modules.

20. A solar-powered modular system comprising:
- a first set of modules, each comprising a housing, a solar panel on at least one outer surface of the housing that is adapted to produce power from solar insolation, a DC system comprising a charge controller that controls the power flow of the DC system from energy produced by the solar panel, DC wiring and a DC outlet, and an AC system comprising an inverter connected to at least one of the solar panel and the DC system, AC wiring, and an AC outlet;
- each of the plurality of modules being electrically connected in series to form a module assembly for connection to power one or more electrical loads; wherein the DC systems of the modules are electrically connected in series, and the AC systems of the modules are electrically connected in series; and
- wherein said first set of modules comprises one primary module and subordinate modules, wherein the primary module further comprises a control system adapted to monitor and control the DC systems of each of the subordinate modules and the inverter of each of the subordinate modules to maintain an AC waveform generally matching a utility power grid AC waveform; and
- the solar-powered modular system further comprising a second set of modules comprising subordinate modules that are connected in series to said primary module of said first set in parallel to the subordinate modules of said first set, wherein said control system of the primary module is adapted to monitor and control the DC systems of each of the subordinate modules of said second set and the inverter of each of the subordinate modules of said second set to maintain an AC waveform generally matching a utility power grid AC waveform; and
- wherein each of the subordinate modules of said first set has a full power rating equal to or greater than a sum of maximum power production of each of the first set subordinate modules and the primary module, wherein each of the subordinate modules of said second set has a full power rating equal to or greater than a sum of maximum power production of each of the second set subordinate modules and the primary module, and the primary has a full power rating equal to or greater than a sum of all of the modules of said first set and said second set, so that the primary module is adapted to be connected to, and to power, said one or more electrical loads that total to be a higher total load than each of said modules of the first set and the second set is adapted to power individually.

\* \* \* \* \*